US012563535B2

(12) United States Patent
Hosseini et al.

(10) Patent No.: US 12,563,535 B2
(45) Date of Patent: Feb. 24, 2026

(54) UPLINK CONTROL RESOURCE DETERMINATION FOR SCHEDULED COMMUNICATIONS WITH DELAYED FEEDBACK REPORTING

(71) Applicant: QUALCOMM Incorporated, San Diego, CA (US)

(72) Inventors: Seyedkianoush Hosseini, San Diego, CA (US); Wei Yang, San Diego, CA (US); Yi Huang, San Diego, CA (US); Konstantinos Dimou, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 18/245,527

(22) PCT Filed: Nov. 4, 2021

(86) PCT No.: PCT/CN2021/128635
§ 371 (c)(1),
(2) Date: Mar. 15, 2023

(87) PCT Pub. No.: WO2022/095923
PCT Pub. Date: May 12, 2022

(65) Prior Publication Data
US 2023/0371028 A1    Nov. 16, 2023

(30) Foreign Application Priority Data
Nov. 4, 2020    (GR) .............................. 20200100664

(51) Int. Cl.
H04L 1/1825    (2023.01)
H04L 1/1829    (2023.01)
(Continued)

(52) U.S. Cl.
CPC ....... H04W 72/0446 (2013.01); H04L 1/1825 (2013.01); H04L 1/1854 (2013.01);
(Continued)

(58) Field of Classification Search
CPC ........... H04L 1/12–1896; H04L 5/0001–0098; H04W 28/02–26; H04W 48/02–20;
(Continued)

(56) References Cited

U.S. PATENT DOCUMENTS

2019/0320437 A1    10/2019    Gupta et al.
2020/0120663 A1    4/2020    Parkvall et al.
(Continued)

FOREIGN PATENT DOCUMENTS

CN    102160304 A    8/2011
CN    109565676 A    4/2019
(Continued)

OTHER PUBLICATIONS

International Search Report and Written Opinion—PCT/CN2021/128635—ISA/EPO—Jan. 11, 2022 (207980WO).
(Continued)

*Primary Examiner* — Timothy J Weidner
(74) *Attorney, Agent, or Firm* — Holland & Hart LLP

(57)    ABSTRACT

Methods, systems, and devices for wireless communications are described. A user equipment (UE) may receive a configuration message indicating a semi-persistent scheduling configuration. The UE may monitor for a downlink data transmission based at least in part on the semi-persistent scheduling configuration. The UE may determine that an uplink feedback message corresponding to the downlink data transmission is scheduled to be transmitted by the UE in a first uplink control resource that at least partially overlaps with a downlink resource, a flexible resource, or both. The UE may identify, based at least in part on the
(Continued)

overlap, a second uplink control resource to use for transmitting the uplink feedback message.

26 Claims, 17 Drawing Sheets

(51) Int. Cl.

| | |
|---|---|
| *H04W 28/02* | (2009.01) |
| *H04W 28/04* | (2009.01) |
| *H04W 72/0446* | (2023.01) |
| *H04W 72/11* | (2023.01) |
| *H04W 72/12* | (2023.01) |
| *H04W 72/21* | (2023.01) |
| *H04W 72/231* | (2023.01) |
| *H04W 84/02* | (2009.01) |
| *H04W 88/02* | (2009.01) |
| *H04W 88/08* | (2009.01) |
| *H04W 92/10* | (2009.01) |

(52) U.S. Cl.
CPC ....... *H04W 28/0205* (2013.01); *H04W 28/04* (2013.01); *H04W 72/11* (2023.01); *H04W 72/12* (2013.01); *H04W 72/21* (2023.01); *H04W 72/231* (2023.01); *H04W 84/02* (2013.01); *H04W 88/02* (2013.01); *H04W 88/08* (2013.01); *H04W 92/10* (2013.01)

(58) Field of Classification Search
CPC ... H04W 72/02–569; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2022/0094484 A1* | 3/2022 | Babaei | .............. | H04W 72/1263 |
| 2022/0377796 A1* | 11/2022 | Jung | ................ | H04W 72/1263 |

FOREIGN PATENT DOCUMENTS

| | | | |
|---|---|---|---|
| CN | 111096018 A | | 5/2020 |
| CN | 111726204 A | | 9/2020 |
| EP | 4224771 A1 | | 8/2023 |
| WO | WO-2017085358 A1 | | 5/2017 |
| WO | WO-2020145704 A1 | | 7/2020 |
| WO | WO-2020204526 A1 | | 10/2020 |

OTHER PUBLICATIONS

CATT: "Discussion on PUSCH Resource Collision and DL SPS Enhancement", 3GPP TSG RAN WG1 Meeting #99, R1-1912174, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823252, 7 Pages, Section 3.1.

Lenovo, et al., "HARQ-ACK Feedback Enhancement for IIoT/URLLC", 3GPP TSG RAN WG1 #103-e, R1-2009101, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 1, 2020, 3 Pages, XP052351028, the whole document.

Sony: "Considerations in HARQ-ACK Enhancements for URLLC", 3GPP TSG RAN WG1 #103-e, R1-2008355, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 1, 2020, 6 Pages, XP052349712, section 2.1.

Supplementary European Search Report—EP21888616—Search Authority—The Hague—Sep. 4, 2024 (207980EP).

CATT: "Discussion on PUSCH Resource Collision and DL SPS Enhancement", 3GPP TSG RAN WG1 Meeting #99, R1-1912174, Reno, USA, Nov. 18, 2019-Nov. 22, 2019, Nov. 9, 2019, 7 Pages.

* cited by examiner

205

210

PDCCH/PDSCH

Feedback Message

PDCCH  215

PDSCH  220

PU~~CC~~H  225

PUCCH  230

*1st UL Resource Blocked*

*2nd UL Resource*

200

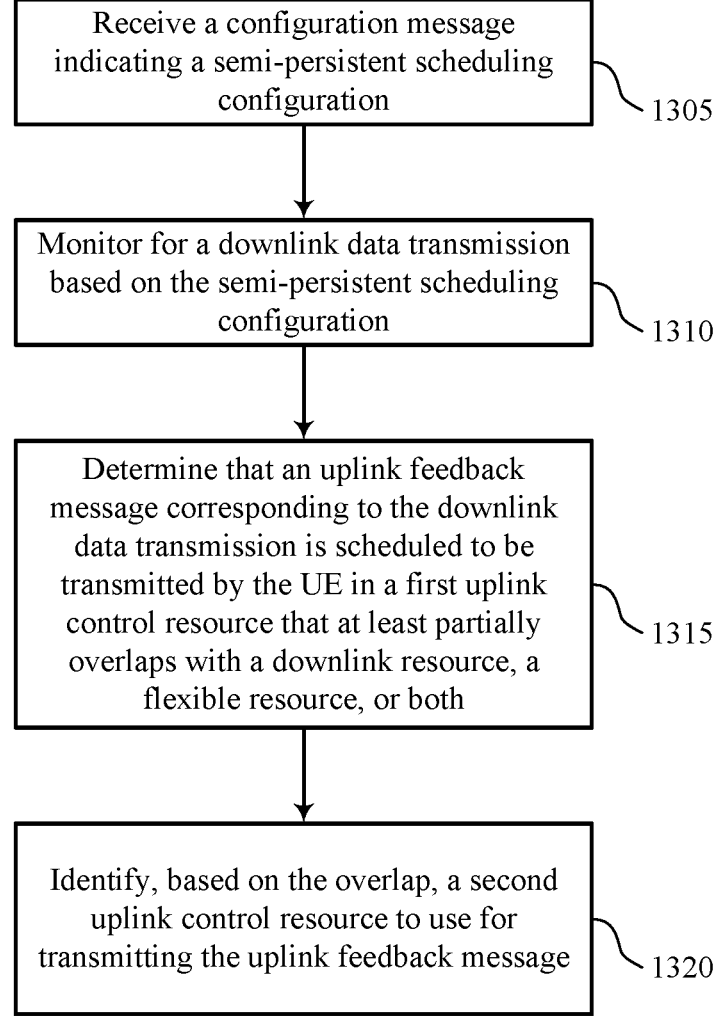

Receive a configuration message
indicating a semi-persistent scheduling
configuration

1305

Monitor for a downlink data transmission
based on the semi-persistent scheduling
configuration

1310

Determine that an uplink feedback
message corresponding to the downlink
data transmission is scheduled to be
transmitted by the UE in a first uplink
control resource that at least partially
overlaps with a downlink resource, a
flexible resource, or both

1315

Identify, based on the overlap, a second
uplink control resource to use for
transmitting the uplink feedback message

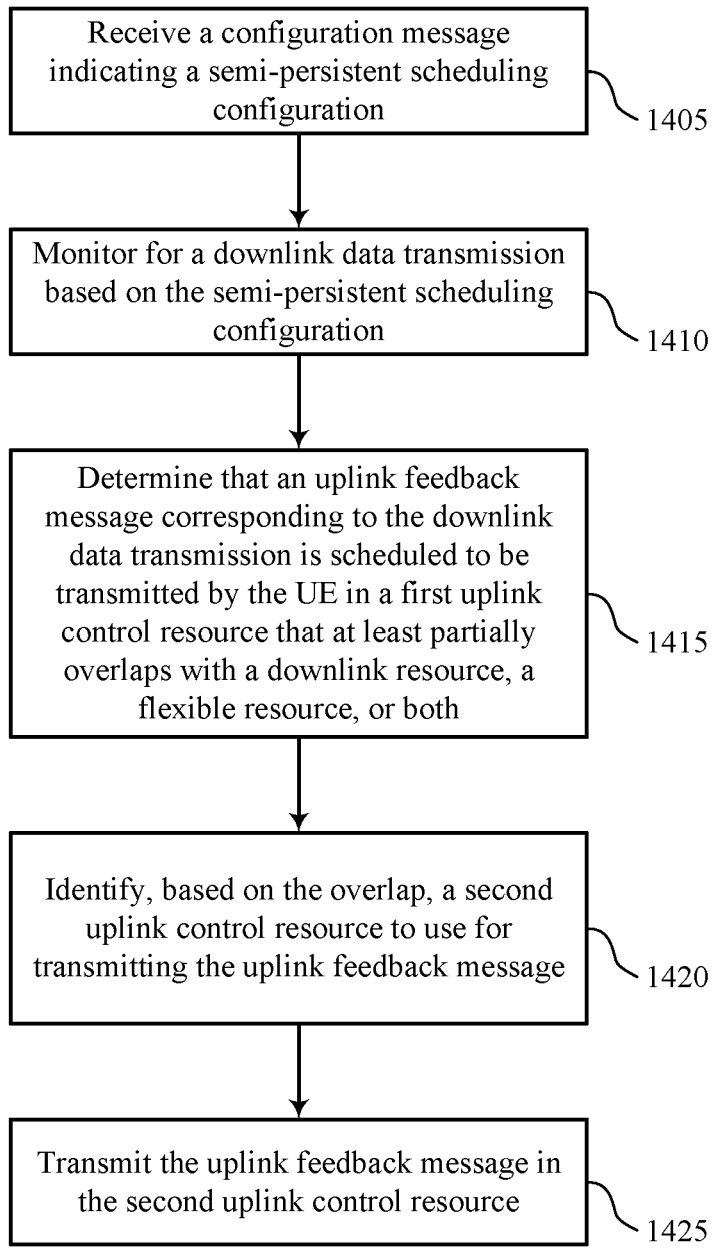

Receive a configuration message indicating a semi-persistent scheduling configuration 〜1405

Monitor for a downlink data transmission based on the semi-persistent scheduling configuration 〜1410

Determine that an uplink feedback message corresponding to the downlink data transmission is scheduled to be transmitted by the UE in a first uplink control resource that at least partially overlaps with a downlink resource, a flexible resource, or both 〜1415

Identify, based on the overlap, a second uplink control resource to use for transmitting the uplink feedback message 〜1420

Transmit the uplink feedback message in the second uplink control resource 〜1425

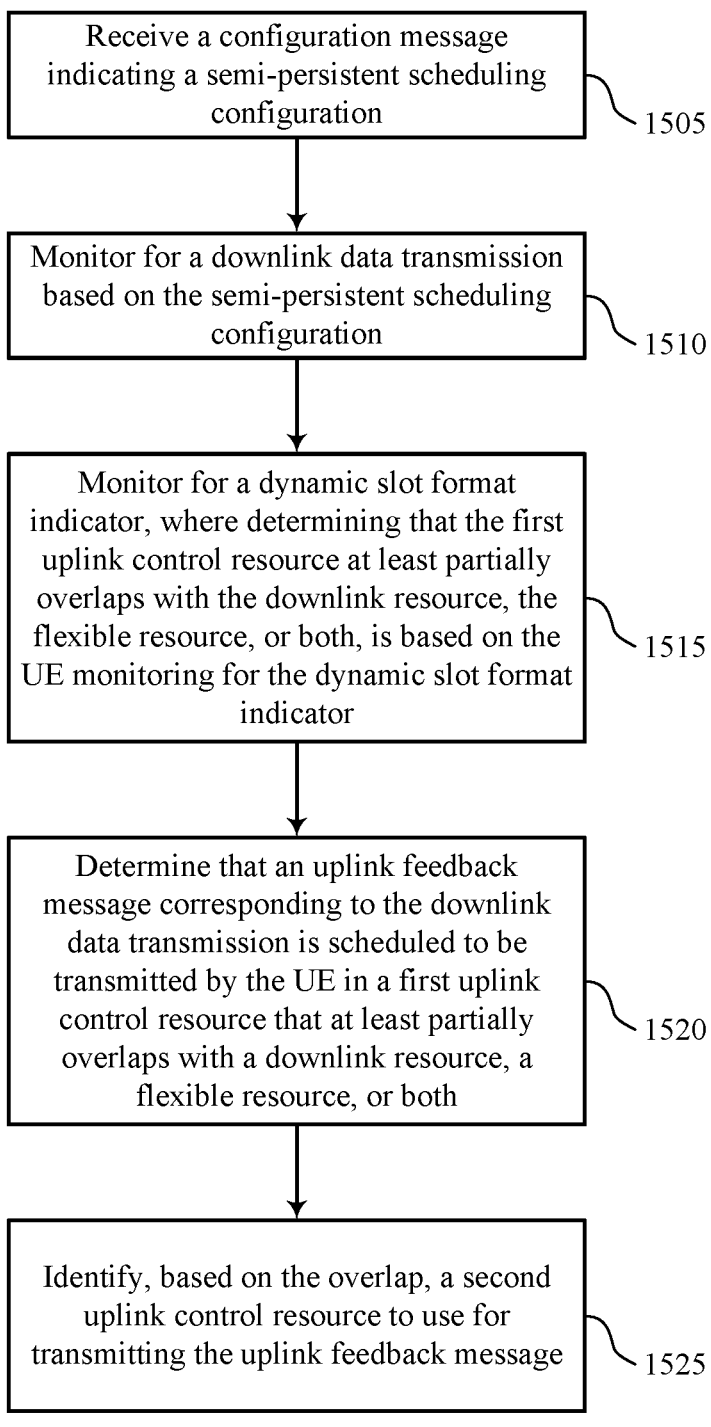

Receive a configuration message indicating a semi-persistent scheduling configuration ⟍ 1505

Monitor for a downlink data transmission based on the semi-persistent scheduling configuration ⟍ 1510

Monitor for a dynamic slot format indicator, where determining that the first uplink control resource at least partially overlaps with the downlink resource, the flexible resource, or both, is based on the UE monitoring for the dynamic slot format indicator ⟍ 1515

Determine that an uplink feedback message corresponding to the downlink data transmission is scheduled to be transmitted by the UE in a first uplink control resource that at least partially overlaps with a downlink resource, a flexible resource, or both ⟍ 1520

Identify, based on the overlap, a second uplink control resource to use for transmitting the uplink feedback message ⟍ 1525

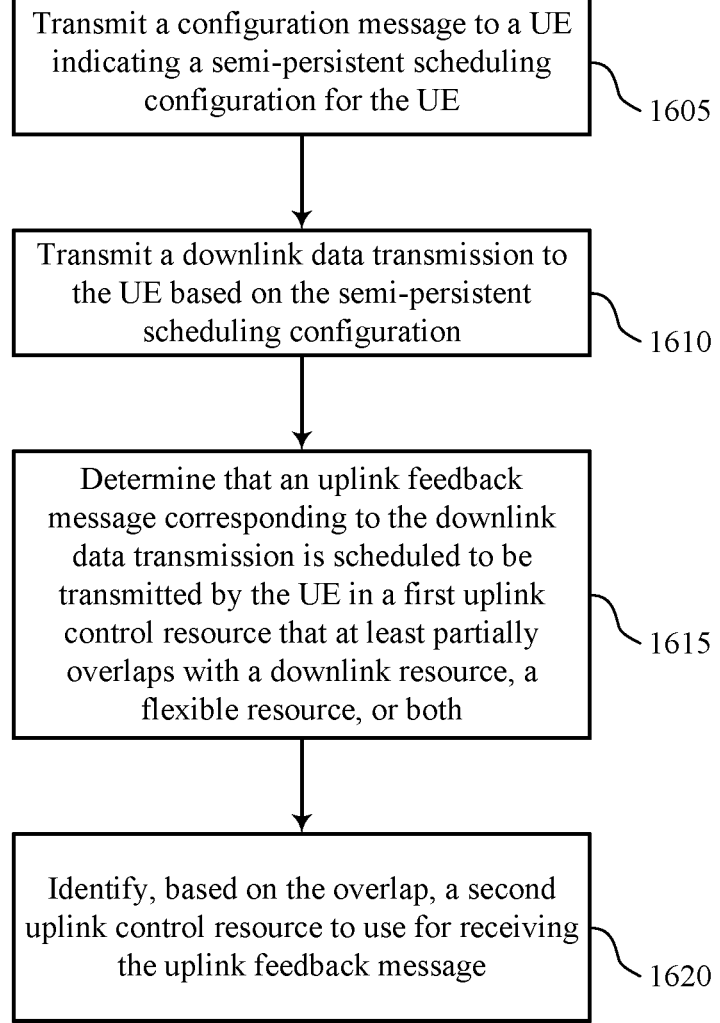

Transmit a configuration message to a UE indicating a semi-persistent scheduling configuration for the UE

1605

Transmit a downlink data transmission to the UE based on the semi-persistent scheduling configuration

1610

Determine that an uplink feedback message corresponding to the downlink data transmission is scheduled to be transmitted by the UE in a first uplink control resource that at least partially overlaps with a downlink resource, a flexible resource, or both

1615

Identify, based on the overlap, a second uplink control resource to use for receiving the uplink feedback message

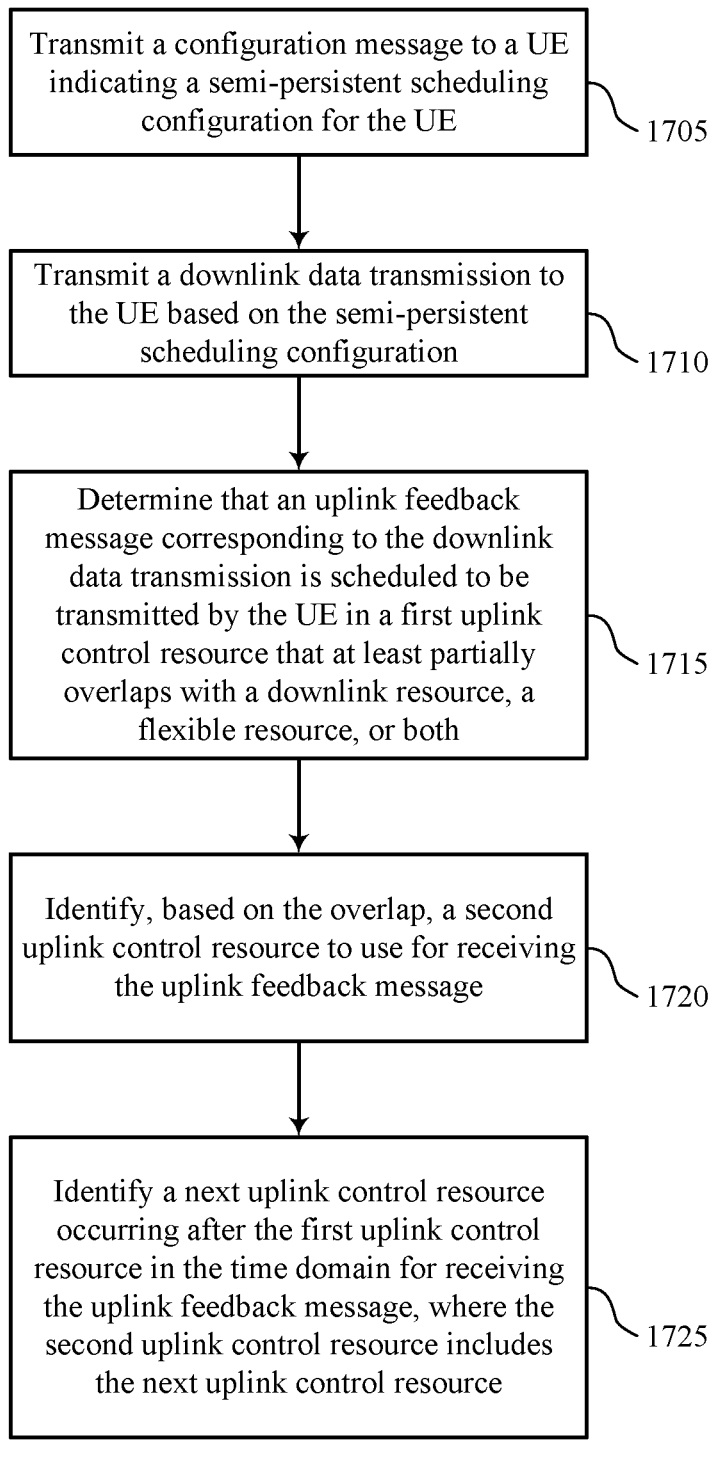

Transmit a configuration message to a UE indicating a semi-persistent scheduling configuration for the UE

1705

Transmit a downlink data transmission to the UE based on the semi-persistent scheduling configuration

1710

Determine that an uplink feedback message corresponding to the downlink data transmission is scheduled to be transmitted by the UE in a first uplink control resource that at least partially overlaps with a downlink resource, a flexible resource, or both

1715

Identify, based on the overlap, a second uplink control resource to use for receiving the uplink feedback message

1720

Identify a next uplink control resource occurring after the first uplink control resource in the time domain for receiving the uplink feedback message, where the second uplink control resource includes the next uplink control resource

UPLINK CONTROL RESOURCE DETERMINATION FOR SCHEDULED COMMUNICATIONS WITH DELAYED FEEDBACK REPORTING

CROSS REFERENCE

The present Application is a 371 national stage filing of International PCT Application No. PCT/CN2021/128635 by HOSSEINI et al. entitled "UPLINK CONTROL RESOURCE DETERMINATION FOR SCHEDULED COMMUNICATIONS WITH DELAYED FEEDBACK REPORTING," filed Nov. 4, 2021; and claims priority to Greece Patent Application No. 20200100664 by HOSSEINI et al., entitled "UPLINK CONTROL RESOURCE DETER-MINATION FOR SEMI-PERSISTENT WITH DELAYED FEEDBACK REPORTING," filed Nov. 4, 2020, each of which is assigned to the assignee hereof, and each of which is expressly incorporated by reference in its entirety herein.

FIELD OF TECHNOLOGY

The following relates to wireless communications, including uplink control resource determination for scheduled communications with delayed feedback reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink control resource determination for scheduled communications with delayed feedback reporting. Generally, the described techniques provide for base station that may transmit control information to a user equipment (UE) indicating scheduled communications for the UE (e.g., a semi-persistent configuration of semi-persistent scheduling (SPS) and/or configured grant (CG) resources). The base station may schedule and perform a downlink data transmission (e.g., a physical downlink shared channel (PDSCH) transmission) to the UE, but the uplink control resource that the UE would otherwise use for the uplink feedback message transmission (e.g., a hybrid automatic repeat/request acknowledgement (HARQ- ACK) feedback message) may overlap, at least to some degree, with a downlink resource (e.g., the uplink control resource may be reconfigured as a downlink resource at the symbol and/or slot level) and/or a flexible resource. Accordingly, the UE and/or base station may identify a second uplink control resource to use for transmission of the uplink feedback message to the base station. The second uplink control resource may correspond to the next configured uplink resource (e.g., physical uplink control channel (PUCCH) resource) or may be radio resource control (RRC) configured per semi-persistent configuration.

A method for wireless communication at a UE is described. The method may include receiving a configuration message indicating a SPS configuration, monitoring for a downlink data transmission based on the SPS configuration, determining that an uplink feedback message corresponding to the downlink data transmission is scheduled to be transmitted by the UE in a first uplink control resource that at least partially overlaps with a downlink resource, a flexible resource, or both, and identifying, based on the overlap, a second uplink control resource to use for transmitting the uplink feedback message.

An apparatus for wireless communication at a UE is described. The apparatus may include a processor, memory in electronic communication with the processor, and instructions stored in the memory. The instructions may be executable by the processor to cause the apparatus to receive a configuration message indicating a SPS configuration, monitor for a downlink data transmission based on the SPS configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for transmitting the uplink feedback message.

Another apparatus for wireless communication at a UE is described. The apparatus may include means for receiving a configuration message indicating a SPS configuration, means for monitoring for a downlink data transmission based on the SPS configuration, means for determining that an uplink feedback message corresponding to the downlink data transmission is scheduled to be transmitted by the UE in a first uplink control resource that at least partially overlaps with a downlink resource, a flexible resource, or both, and means for identifying, based on the overlap, a second uplink control resource to use for transmitting the uplink feedback message.

A non-transitory computer-readable medium storing code for wireless communication at a UE is described. The code may include instructions executable by a processor to receive a configuration message indicating a SPS configuration, monitor for a downlink data transmission based on the SPS configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for transmitting the uplink feedback message.

Some examples of the method, apparatuses, and non-transitory computer-readable medium described herein may further include operations, features, means, or instructions for transmitting the uplink feedback message in the second uplink control resource.

Some examples of the method, apparatuses, and non-transitory computer-readable medium described herein may further include operations, features, means, or instructions for monitoring for a dynamic slot format indicator, where determining that the first uplink control resource at least partially overlaps with the downlink resource, the flexible resource, or both, may be based on the UE monitoring for the dynamic slot format indicator.

Some examples of the method, apparatuses, and non-transitory computer-readable medium described herein may further include operations, features, means, or instructions for identifying a next uplink control resource occurring after the first uplink control resource in the time domain for transmitting the uplink feedback message, where the second uplink control resource includes the next uplink control resource.

Some examples of the method, apparatuses, and non-transitory computer-readable medium described herein may further include operations, features, means, or instructions for identifying the second uplink control resource based on the configuration message.

Some examples of the method, apparatuses, and non-transitory computer-readable medium described herein may further include operations, features, means, or instructions for receiving a second configuration message indicating a second SPS configuration, monitoring for a second downlink data transmission based on the second SPS configuration, determining that a second uplink feedback message corresponding to the second downlink data transmission is scheduled to be transmitted by the UE in the second uplink control resource that at least partially overlaps with a second downlink resource, a second flexible resource, or both, and identifying, based on the overlap, a third uplink control resource to use for transmitting the uplink feedback message, the second uplink feedback message, or both.

Some examples of the method, apparatuses, and non-transitory computer-readable medium described herein may further include operations, features, means, or instructions for transmitting the uplink feedback message corresponding to the downlink data transmission in the third uplink control resource while refraining from transmitting the second uplink feedback message.

Some examples of the method, apparatuses, and non-transitory computer-readable medium described herein may further include operations, features, means, or instructions for transmitting the second uplink feedback message corresponding to the second downlink data transmission in the third uplink control resource while refraining from transmitting the uplink feedback message.

Some examples of the method, apparatuses, and non-transitory computer-readable medium described herein may further include operations, features, means, or instructions for refraining from transmitting the uplink feedback message corresponding to the downlink data transmission and the second uplink feedback message corresponding to the second downlink data transmission.

Some examples of the method, apparatuses, and non-transitory computer-readable medium described herein may further include operations, features, means, or instructions for initiating a first feedback message delay counter corresponding to a transmission delay for the uplink feedback message and a second feedback message delay counter corresponding to the transmission delay for the second uplink feedback message, transmitting or dropping the uplink feedback message based on the first feedback message delay counter, and transmitting or dropping the second uplink feedback message based on the second feedback message delay counter.

A method for wireless communication at a base station is described. The method may include transmitting a configuration message to a UE indicating a SPS configuration for the UE, transmitting a downlink data transmission to the UE based on the SPS configuration, determining that an uplink feedback message corresponding to the downlink data transmission is scheduled to be transmitted by the UE in a first uplink control resource that at least partially overlaps with a downlink resource, a flexible resource, or both, and identifying, based on the overlap, a second uplink control resource to use for receiving the uplink feedback message.

An apparatus for wireless communication at a base station is described. The apparatus may include a processor, memory in electronic communication with the processor, and instructions stored in the memory. The instructions may be executable by the processor to cause the apparatus to transmit a configuration message to a UE indicating a SPS configuration for the UE, transmit a downlink data transmission to the UE based on the SPS configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for receiving the uplink feedback message.

Another apparatus for wireless communication at a base station is described. The apparatus may include means for transmitting a configuration message to a UE indicating a SPS configuration for the UE, means for transmitting a downlink data transmission to the UE based on the SPS configuration, means for determining that an uplink feedback message corresponding to the downlink data transmission is scheduled to be transmitted by the UE in a first uplink control resource that at least partially overlaps with a downlink resource, a flexible resource, or both, and means for identifying, based on the overlap, a second uplink control resource to use for receiving the uplink feedback message.

A non-transitory computer-readable medium storing code for wireless communication at a base station is described. The code may include instructions executable by a processor to transmit a configuration message to a UE indicating a SPS configuration for the UE, transmit a downlink data transmission to the UE based on the SPS configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for receiving the uplink feedback message.

Some examples of the method, apparatuses, and non-transitory computer-readable medium described herein may further include operations, features, means, or instructions for receiving the uplink feedback message in the second uplink control resource.

Some examples of the method, apparatuses, and non-transitory computer-readable medium described herein may further include operations, features, means, or instructions for transmitting a dynamic slot format indicator, where determining that the first uplink control resource at least partially overlaps with the downlink resource, the flexible resource, or both, may be based on the UE monitoring for the dynamic slot format indicator.

Some examples of the method, apparatuses, and non-transitory computer-readable medium described herein may further include operations, features, means, or instructions for identifying a next uplink control resource occurring after the first uplink control resource in the time domain for receiving the uplink feedback message, where the second uplink control resource includes the next uplink control resource.

Some examples of the method, apparatuses, and non-transitory computer-readable medium described herein may further include operations, features, means, or instructions for identifying the second uplink control resource based on the configuration message.

Some examples of the method, apparatuses, and non-transitory computer-readable medium described herein may further include operations, features, means, or instructions for transmitting a second configuration message indicating a second SPS configuration for the UE, transmitting a second downlink data transmission to the UE based on the second SPS configuration, determining that a second uplink feedback message corresponding to the second downlink data transmission may be scheduled to be transmitted by the UE in the second uplink control resource that at least partially overlaps with a second downlink resource, a second flexible resource, or both, and identifying, based on the overlap, a third uplink control resource to use for receiving the uplink feedback message, the second uplink feedback message, or both.

Some examples of the method, apparatuses, and non-transitory computer-readable medium described herein may further include operations, features, means, or instructions for receiving, based on the overlap, the uplink feedback message corresponding to the downlink data transmission in the third uplink control resource while refraining from receiving the second uplink feedback message.

Some examples of the method, apparatuses, and non-transitory computer-readable medium described herein may further include operations, features, means, or instructions for receiving, based on the overlap, the second uplink feedback message corresponding to the second downlink data transmission in the third uplink control resource while refraining from receiving the uplink feedback message.

Some examples of the method, apparatuses, and non-transitory computer-readable medium described herein may further include operations, features, means, or instructions for refraining, based on the overlap, from receiving the uplink feedback message corresponding to the downlink data transmission and the second uplink feedback message corresponding to the second downlink data transmission.

BRIEF DESCRIPTION OF THE DRAWINGS

FIGS. 13 through 17 show flowcharts illustrating methods that support uplink control resource determination for scheduled communications with delayed feedback reporting in accordance with aspects of the present disclosure.

DETAILED DESCRIPTION

Wireless communications systems may configure semi-persistent resources for a user equipment (UE). For example, a downlink control information (DCI) activating a downlink data transmission (e.g., a physical downlink shared channel (PDSCH) transmission) may also signal the timeline (e.g., resources) for the corresponding hybrid automatic repeat/request acknowledgement (HARQ-ACK) feedback message, which may utilize the configured physical uplink control channel (PUCCH) resources. In another example, (e.g., semi-persistent scheduling (SPS) type 1) semi-persistent resources may be configured/activated using radio resource control (RRC) signaling (e.g., the PDSH resource indicator (PRI), K1 value, etc.). However, in some situations (e.g., slot format indicator (SFI)-based changes) the semi-persistent PUCCH resources may be unavailable for the HARQ-ACK feedback message transmission. For example, some or all of the configured semi-persistent PUCCH resources may now overlap with downlink resources (D or DL) and/or flexible resources (F) (e.g., the symbol(s) and/or slot(s) may be reconfigured from uplink (U or UL) to flexible resources or downlink resources). Accordingly, the UE may be unable to transmit the HARQ-ACK feedback message to the base station. This may result in a PDSCH retransmission regardless of whether the UE was able to successfully receive and decode the original PDSCH transmission.

Aspects of the disclosure are initially described in the context of wireless communications systems. Generally, the described techniques provide for base station that may transmit control information to a UE indicating a semi-persistent configuration for the UE (e.g., a semi-persistent configuration of semi-persistent scheduling (SPS) and/or configured grant (CG) resources). The base station may schedule and perform a downlink data transmission (e.g., a PDSCH transmission) to the UE, but the uplink control resource that the UE would otherwise use for the uplink feedback message transmission (e.g., a HARQ-ACK feedback message) may overlap, at least to some degree, with a downlink resource (e.g., the uplink control resource may be reconfigured as a downlink resource at the symbol and/or slot level) and/or a flexible resource. Accordingly, the UE and/or base station may identify a second uplink control resource to use for transmission of the uplink feedback message to the base station. The second uplink control resource may correspond to the next configured uplink resource (e.g., PUCCH resource) or may be radio resource control (RRC) configured per semi-persistent configuration.

Aspects of the disclosure are further illustrated by and described with reference to apparatus diagrams, system diagrams, and flowcharts that relate to uplink control resource determination for scheduled communications with delayed feedback reporting.

Figure 1:
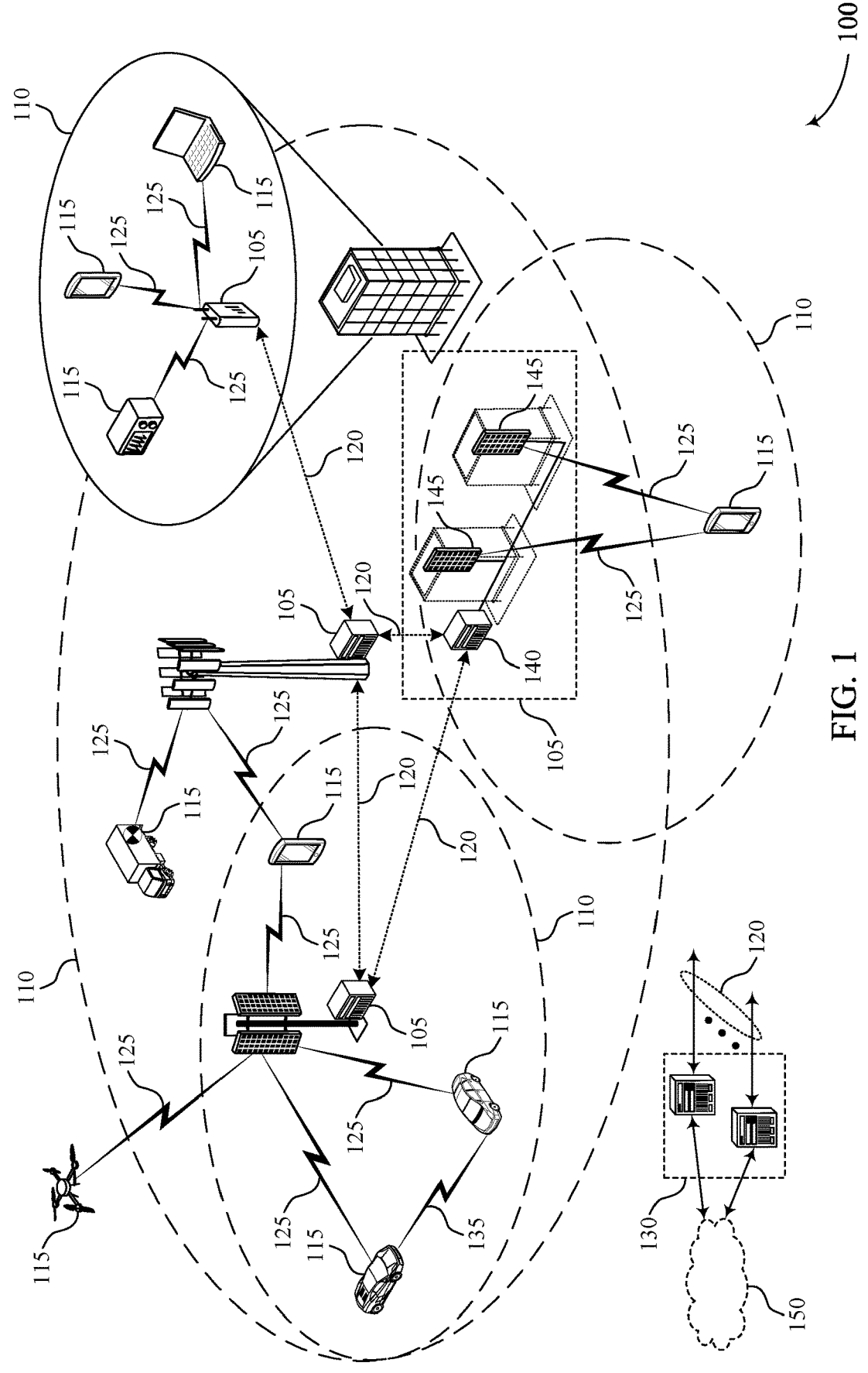
FIG. 1 illustrates an example of a system for wireless communications that supports uplink control resource determination for scheduled communications with delayed feedback reporting in accordance with aspects of the present disclosure.

FIG. 1 illustrates an example of a wireless communications system 100 that supports uplink control resource determination for scheduled communications with delayed feedback reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration message indicating a semi-persistent scheduling configuration. The UE 115 may monitor for a downlink data transmission based at least in part on the semi-persistent scheduling configuration. The UE 115 may determine that an uplink feedback message corresponding to the downlink data transmission is scheduled to be transmitted by the UE 115 in a first uplink control resource that at least partially overlaps with a downlink resource and/or a flexible resource. The UE 115 may identify, based at least in part on the overlap, a second uplink control resource to use for transmitting the uplink feedback message.

A base station 105 may transmit a configuration message to a UE 115 indicating a semi-persistent scheduling configuration for the UE 115. The base station 105 may transmit a downlink data transmission to the UE 115 based at least in part on the semi-persistent scheduling configuration. The UE 115 may determine that an uplink feedback message corresponding to the downlink data transmission is scheduled to be transmitted by the UE 115 in a first uplink control resource that at least partially overlaps with a downlink resource and/or a flexible resource. The base station 105 may identify, based at least in part on the overlap, a second uplink control resource to use for receiving the uplink feedback message.

Figure 2:
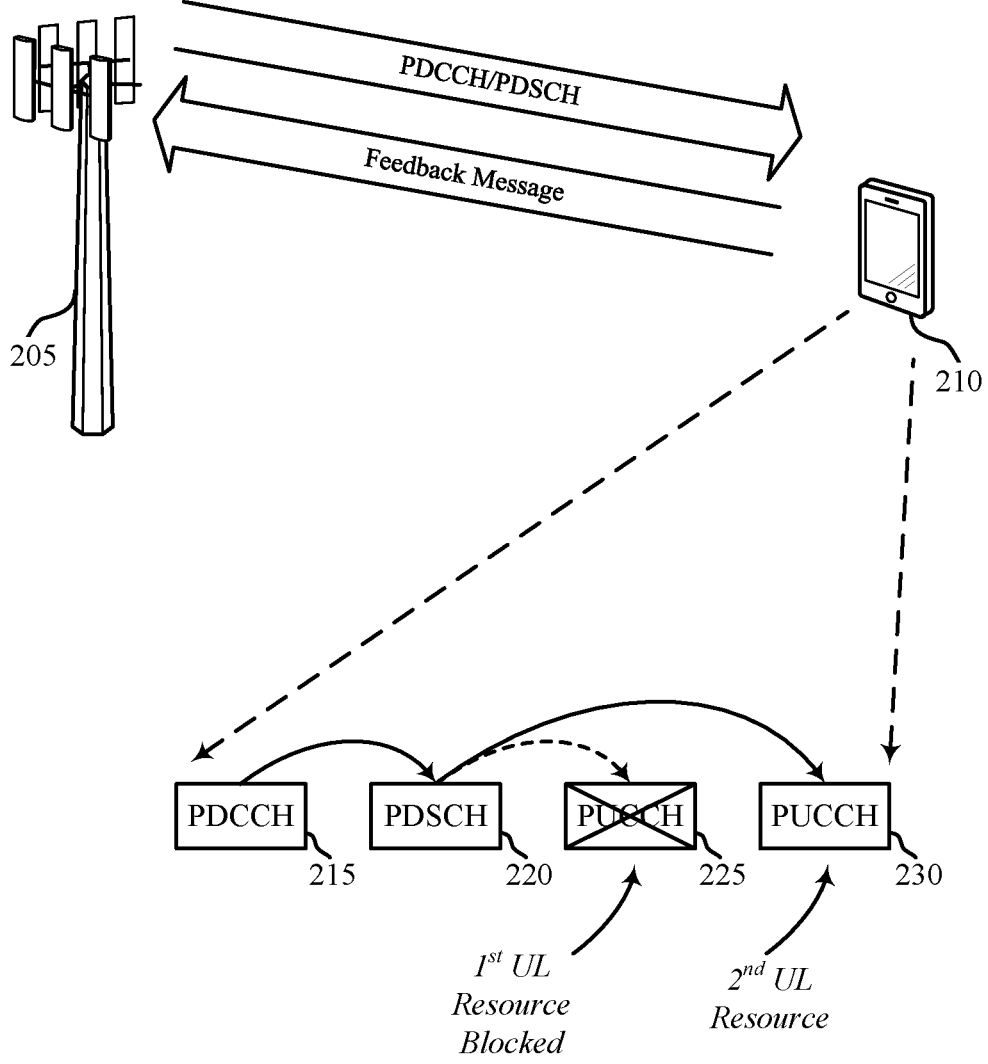
FIG. 2 illustrates an example of a wireless communication system that supports uplink control resource determination for scheduled communications with delayed feedback reporting in accordance with aspects of the present disclosure.
Figure 2:

FIG. 2 illustrates an example of a wireless communication system 200 that supports uplink control resource determination for scheduled communications with delayed feedback reporting in accordance with aspects of the present disclosure. In some examples, wireless communication system 200 may implement aspects of wireless communications system 100. Wireless communication system 200 may include base station 205 and/or UE 210, which may be examples of the corresponding devices described herein.

Base station 205 may configure UE 210 with scheduled communications such as one or more semi-persistent configurations (e.g., SPS and/or CG configurations). For each semi-persistent configuration, the HARQ-ACK feedback timeline (e.g., as indicated in the K1 information element (IE) field) may be indicated in the DCI format activating the semi-persistent configuration. If the K1 field is not included or otherwise indicated in the DCI, K1 may be provided by the RRC parameter (e.g., RRC configured dl-DataToUL-ACK). The PUCCH resource to be used for the semi-persistent PDSCH occasion (e.g., SPS resource activated by the DCI) of a given SPS configuration may be determined by (1) for the first PDSCH after the activating DCI, the PUCCH resource may be determined by the PRI or (2) for all the other PDSCH occasions, the PUCCH resource may be given by an RRC parameter called SPS-PUCCH-A/N. In the SPS type 1 scenario, such parameters may be provided via RRC signaling.

Some wireless communication systems may operate in a TDD manner where slot(s) and/or symbol(s) are configured as available for uplink (U), downlink (D), or flexible (F), e.g., for use in either uplink or downlink. For example, a slot format indicator (SFI) may be used to configure/reconfigure the symbol(s) and/or slot(s) for UE 210. In such a TDD system, it may occur that for some SPS occasions, the K1 and/or dynamic/semi-static PRI may point to a PUCCH resource that is not valid for PUCCH transmissions.

For example, for an SPS PDSCH occasion, K1 may point to a semi-static downlink slot. That is, base station 205 may configure UE 210 with an indication of a semi-persistent configuration. The semi-persistent configuration may include SPS and/or CG resources configured for UE 210, e.g., using RRC signaling, IP based signaling, a MAC control element (CE), and the like. Base station 205 may subsequently transmit a DCI grant to UE 210 in PDCCH 215 that activates a PDSCH 220 occasion for a downlink transmission to UE 210. The K1 and/or the dynamic/semi-static PRI may point to a PUCCH resource (e.g., PUCCH 225) that is not available for UE 210 to use for transmitting a feedback message (e.g., HARQ-ACK) indicating whether UE 210 was able to successfully receive and decode PDSCH 220.

As discussed, in some situations UE 210 may determine that the PUCCH 225 resource (e.g., a first uplink control resource) is not available for performing an uplink transmission of the feedback message. For example, UE 210 may determine that the K1 points to a semi-statically configured downlink slot/symbol. That is, the semi-static configuration for SPS resources and/or the DCI activating the SPS resources may include a PRI indicating that the corresponding uplink control resource that UE 210 is to use for the corresponding PUCCH 225 transmission carrying the feedback message occurs N symbol(s)/slot(s) after the PDCCH 215 carrying the DCI grant or PDSCH 220 corresponding to the SPS PDSCH occasion. However, the symbol(s)/slot(s) corresponding to N may be configured as downlink symbol(s)/slot(s), e.g., via the SFI mechanism. Accordingly, the symbol(s)/slot(s) corresponding to N are not available for a PUCCH 225 transmission due to the overlap with the downlink resources and/or flexible resources. In some aspects, this may also correspond to the situation where K1 and PM point to a PUCCH resource which is partially not valid for the PUCCH 225 transmission, (e.g., some of the symbol(s)/slot(s) of the PUCCH resource overlap with semi-static downlink symbol(s)/slot(s)). Accordingly, UE 210 may identify or otherwise determine that an uplink feedback message (e.g., carried in PUCCH 225) corresponding to downlink data transmission (e.g., PDSCH 220) is scheduled to be transmitted in a first uplink control resource (e.g., PUCCH 225) that at least partially overlaps with a downlink resource (e.g., symbol(s)/slot(s) configured for downlink transmissions) and/or a flexible resource.

In some wireless communication systems, when such an overlap occurs the PUCCH 225 transmission is simply dropped. That is, when PUCCH resource for SPS collides with invalid symbol(s)/slot(s), the PUCCH transmission of the feedback message would be dropped by UE 210. This, however, is costly in such TDD bands where all of the SPS PDSCHs for which the HARQ-ACK dropped would now have to retransmitted. That is, dropping the HARQ-ACK feedback message due to a configured PUCCH resource now overlapping with a downlink and/or flexible resource would result in base station 205 not receiving the HARQ-ACK feedback. In that situation, base station 205 would have to perform a retransmission of each PDSCH occasion being indicated in the dropped HARQ-ACK feedback. In turn, this would require UE 210 to receive such retransmissions, determine and transmit HARQ-ACK feedback for the retransmissions. This may be costly in terms of over-the-air resources, processing at base station 205 and/or UE 210, increased latency, reduced QoS satisfaction, and the like.

Accordingly, aspects of the described techniques provide various mechanisms where base station 205 and/or UE 210 may delay the PUCCH 225 transmission to a future valid PUCCH occasion (e.g., PUCCH 230). More particularly, aspects of the described techniques provide various mechanisms where base station 205 and/or UE 210 may determine the next available PUCCH occasion for the transmission of the delayed PUCCH 225. In some aspects, this may include base station 205 and/or UE 210 identifying or otherwise determining a second uplink control resource (e.g., PUCCH 230) to use for transmitting the feedback message (e.g., HARQ-ACK feedback) to base station 205. Accordingly and in some examples, UE 210 may transmit the uplink feedback message (e.g., HARQ-ACK feedback message originally to be transmitted in PUCCH 225) in the second uplink control resource (e.g., PUCCH 230). As PUCCH 230 may already be configured to carry a feedback message for different PDSCH occasion(s), UE 210 may combine the feedback message corresponding to PDSCH 220 (as originally scheduled for PUCCH 225) with the feedback message for the different PDSCH occasion(s) or may transmit separate feedback messages in PUCCH 230. In some examples, feedback message(s) may be transmitted in a PUCCH and/or PUSCH transmission.

Aspects of the described techniques may differentiate two use cases regarding whether or not UE 210 is configured to monitor for a dynamic SFI indication (e.g., an SFI indication provided in a DCI format 2_0). In one use case, UE 210 may not be configured to monitor for dynamic SFI indications. In some cases, PUCCH can be sent on semi-static flexible symbol(s)/slot(s) (e.g., configured as F). However, dynamic SFI indications may change the direction of the symbol(s)/slot(s) from U or F to D, which would make the corresponding symbol(s)/slot(s) invalid for a PUCCH transmission.

In another use case, UE 210 may be configured to monitor for dynamic SFI indications. In some examples where UE 210 is configured to monitor for dynamic SFI indications, base station 205 may decide whether or not to transmit a dynamic SFI indication in some monitoring occasions. UE 210, in this situation, could not know the difference (e.g., whether base station 205 did not transmit a dynamic SFI indication or whether UE 210 was not able to successfully receive and decode a dynamic SFI indication) and, therefore, there may be misalignment between base station 205 and UE 210. In some aspects where UE 210 is configured to monitor for dynamic SFI indications, base station 205 may or may not configure UE 210 to transmit PUCCH if the PUCCH fully or partially overlaps with flexible symbols (e.g., flexible resources). For example, base station 205 may configure UE 210 to transmit PUCCH if it fully or partially overlaps with flexible symbols or not. Thus, whether the transmission is allowed or not may be based on this additional configuration. In some aspects, whether or not transmissions on a flexible symbol are allowed may be based on one or more other configurations, e.g., not necessarily tied to whether UE 210 is configured for monitoring for dynamic SFI indications.

To avoid this issue, aspects of the described techniques provide different options that base station 205 and/or UE 210 may select from to ensure a reliable transmission of a delayed PUCCH (e.g., the delayed PUCCH 225 carrying the HARQ-ACK feedback message). In one option where an SPS PUCCH is delayed and UE 210 is not configured to monitor for dynamic SFI indications, the delayed PUCCH resource could fully or partially overlap with a semi-static flexible (F) resource. In this option where UE 210 is configured to monitor for dynamic SFI indications, the delayed PUCCH resource cannot, even partially, overlap with the semi-static flexible symbol(s)/slot(s). In other words, the PUCCH resource should be fully contained within a semi-static uplink portion of the symbol(s)/slot(s). With this approach, the potential misalignment between UE 210 and base station 205 may be avoided. Accordingly, UE 210 may monitor for the dynamic SFI, which UE 210 may use to determine that the first uplink control resource (e.g., PUCCH 225) at least partially overlaps with the downlink resource and/or flexible resource based on the dynamic SFI indication changing some or all of the first uplink control resource to a downlink resource. In other cases, if an SPS PUCCH is delayed and the UE 210 is configured to monitor for dynamic SFI indications, the delayed PUCCH resource could fully or partially be overlapping with the semi-static flexible symbols, which is dependent on whether SFI DCI is detected or not. In this case, if the UE 210 is not configured to monitor for dynamic SFI, the delayed PUCCH resource cannot, even partially, overlap with the semi-static flexible symbols. In other words, the PUCCH resource should be fully contained in semi-static UL portion of a slot. With this approach again, the potential ambiguity between UE 210 and base station 205 is avoided.

In a second option, the delayed HARQ-ACK may only be sent in the full semi-static uplink slots. That is, the feedback message scheduled to be transmitted in PUCCH 225 may be transmitted fully within PUCCH 230 (e.g., the second uplink control resource).

In some aspects, base station 205 and/or UE 210 may, e.g., based on the overlap between the first uplink control resource with the downlink and/or flexible resource, identify a second uplink control resource (e.g., PUCCH 230) to use for transmitting the uplink feedback message (e.g., HARQ-ACK feedback) for PDSCH 220. In one option, this may include the second uplink control resource corresponding to the next available symbol(s)/slot(s) with valid PUCCH resources. That is, base station 205 and/or UE 210 may identify the next uplink control resources occurring after the first uplink control resources in the time domain. In this example, this may include PUCCH 230 being the next available uplink control resource occurring after PUCCH 225.

In another option, this may include the offset (e.g., the delay between the PDCCH 215/PDSCH 220 and the corresponding PUCCH resource) being given by RRC signaling for each SPS configuration. The offset could count all of the symbol(s)/slot(s) (including those configured as D), only mixed slot(s) (e.g., D, F, and U) and U slot(s), or only U symbol(s)/slot(s). Accordingly, the RRC signaling used as configuration signaling to identify the semi-persistent scheduling configuration may be used by base station 205 and/or UE 210 to identify the second uplink control resource (e.g., to identify PUCCH 230).

In some scenarios, the delayed HARQ-ACK may be multiplexed with another SPS HARQ-ACK of another PUCCH occasion that is also invalid for PUCCH transmission. That is, base station 205 may transmit or otherwise convey a subsequent configuration message to UE 210 indicating a second SPS configuration (e.g., may configure UE 210 with additional SPS and/or CG resources). UE 210 may monitor for a second downlink data transmission according to the second SPS configuration. However, base station 205 and/or UE 210 may identify or otherwise determine that the second uplink feedback message corresponding to the second downlink data transmission is scheduled to be transmitted by the UE in the second uplink control resource (e.g., the backup PUCCH resource, which is PUCCH 230 in this example) originally identified for use in transmitting the first uplink feedback message (e.g., the first PUCCH). However, base station 205 and/or UE 210 may also determine that the second uplink control resource (e.g., PUCCH 230) is also invalid (e.g., at least partially overlaps with a second downlink and/or a second flexible resource). Accordingly, base station 205 and/or UE 210 may identify or otherwise select a third uplink control resource (e.g., a third PUCCH) to use for transmitting the first uplink feedback message and/or the second uplink feedback message (e.g., corresponding to the second downlink data transmission).

Aspects of the described techniques provide various mechanisms that may be adopted by base station 205 and/or UE 210 when identifying the third uplink control resource, multiplexing the delayed HARQ-ACK with the second HARQ-ACK, and the like.

In one option, UE 210 may not expect this scenario to occur due to scheduling decisions adopted by base station 205. For example, base station 205 may know that this situation may occur and also know how many HARQ-ACK bits should be accumulated by UE 210, and can therefore configure PUCCH resources accordingly. Accordingly, this may prevent the situation where UE 210 would have to choose between delaying the first HARQ-ACK (e.g., the uplink feedback message originally scheduled for PUCCH 225), the second HARQ-ACK (e.g., the second uplink feedback message scheduled for PUCCH 230), or both.

In another option, either the originally delayed HARQ-ACK (e.g., the uplink feedback message originally scheduled for PUCCH 225), the second delayed HARQ-ACK (e.g., the second uplink feedback message scheduled for PUCCH 230), or both, are delayed. In some examples, this may include UE 210 delaying the second delayed HARQ-ACK and only transmitting the originally delayed HARQ-ACK if the PUCCH resource for the delayed HARQ-ACK bits is valid. For example, UE 210 may transmit the uplink feedback message corresponding to the downlink data transmission in the third uplink control resource while refraining from transmitting the second uplink feedback message.

In some examples, this may include UE 210 delaying the originally delayed HARQ-ACK and only transmitting the new HARQ-ACK (e.g., the second delayed HARQ-ACK) if the PUCCH resource for the new HARQ-ACK bits is valid. For example, UE 210 may transmit the second uplink feedback message corresponding to the second downlink data transmission in the third uplink control resource while refraining from transmitting the uplink feedback message.

In some examples, this may include UE 210 delaying both the originally delayed HARQ-ACK and the second delayed HARQ-ACK (e.g., refraining from transmitting the uplink feedback message and the second uplink feedback message). If each set of HARQ-ACK bits can be delayed only a certain amount of time before being dropped, the described techniques include UE 210 and/or base station 205 counting each set of HARQ-ACK bits separately. That is, in the example discussed above where the delay counter for the originally delayed HARQ-ACK bits is 1 and for the second delayed HARQ-ACK bits is 0. If both sets of HARQ-ACK bits are delayed again (as is described above), the delay counters increment to 2 and 1, respectively. This may continue for each instance where the PUCCH occasion corresponding to a PDSCH transmission overlaps with a downlink and/or flexible resource or is otherwise unavailable for use for an uplink transmission (e.g., each delay counter would increment by one each delay instance). Accordingly, aspects of the described techniques may include UE 210 delaying a HARQ-ACK for an SPS occasion with HARQ process number A until before the start of (1) an SPS PDSCH of the same HARQ process number occurs, or (2) the HARQ-ACK reporting opportunity corresponding to the next SPS PDSCH with the same HARQ process number occurs. Accordingly, UE 210 and/or base station 205 may initiate a first feedback message delay counter (e.g., a first delay counter) corresponding to a transmission delay for the uplink feedback message and a second feedback message delay counter (e.g., a second delay counter) corresponding to the transmission delay for the second uplink feedback message. The UE 210 may transmit or drop the uplink feedback message and/or the second uplink feedback message based at least in part on each corresponding delay counter.

Figure 3:
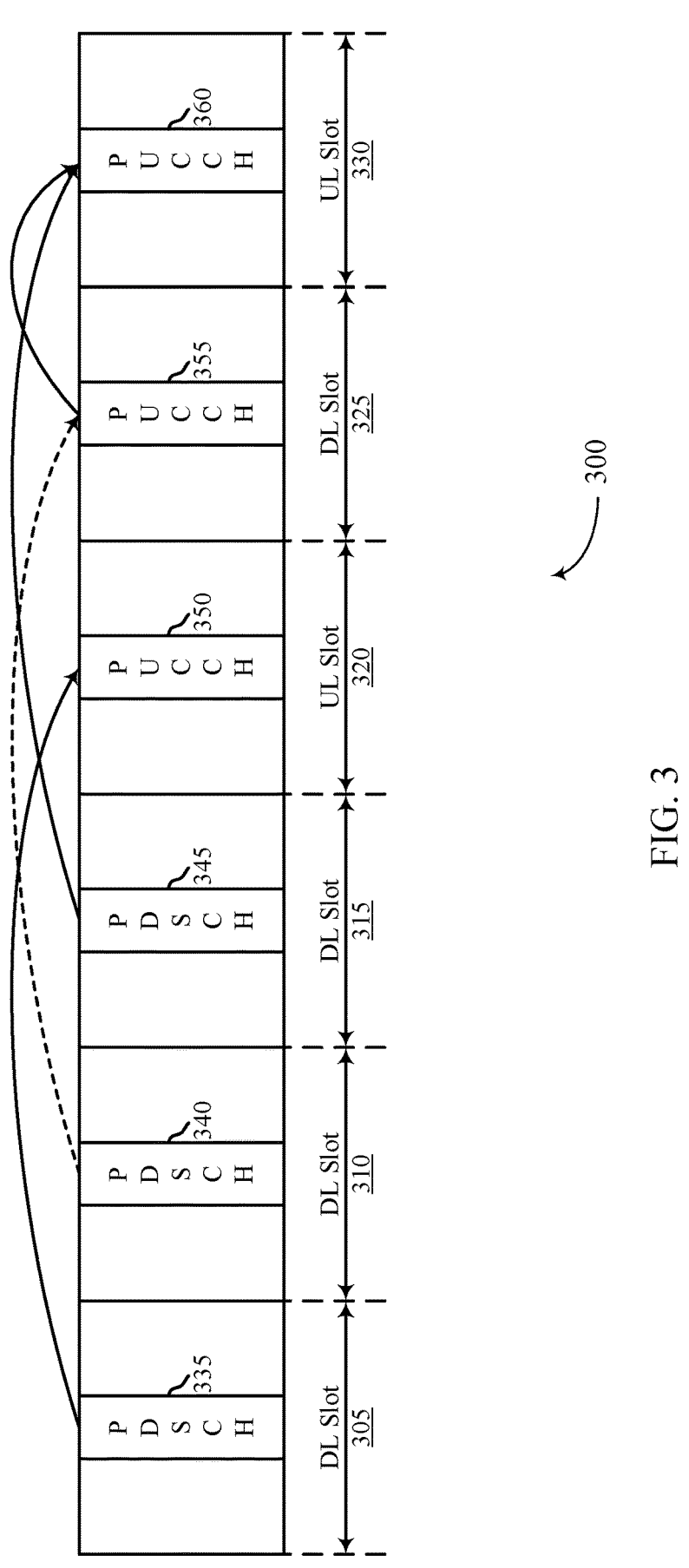
FIG. 3 illustrates an example of a feedback configuration that supports uplink control resource determination for scheduled communications with delayed feedback reporting in accordance with aspects of the present disclosure.

FIG. 3 illustrates an example of a feedback configuration 300 that supports uplink control resource determination for scheduled communications with delayed feedback reporting in accordance with aspects of the present disclosure. In some examples, feedback configuration 300 may implement aspects of wireless communications systems 100 and/or 200. Aspects of feedback configuration 300 may be implemented at or implemented by a UE and/or base station, which may be examples of the corresponding devices described herein.

As discussed above, aspects of the described techniques provide various mechanisms for the base station and/or UE to identify a second uplink control resource (e.g., second PUCCH) to use for transmitting a HARQ-ACK feedback message when the configured uplink control resources (e.g., a first PUCCH) overlaps with a downlink and/or flexible resource. For example, the base station may configure the UE with a SPS configuration, e.g., via RRC signaling. The SPS configuration may identify SPS and/or CG resources that are semi-statically configured for the UE. In some aspects, the SPS configuration may identify an offset for an uplink control resource (e.g., the first PUCCH) the UE is to use for transmitting the feedback message. The base station may schedule a downlink data transmission (e.g., PDSCH) by transmitting a DCI grant on PDCCH that activates a configured SPS and/or CG resource. Accordingly, the base station may monitor for the downlink data transmission according to the SPS and/or CG resource configured in the SPS configuration.

In some aspects, the UE and/or base station may identify or otherwise determine that an uplink feedback message (e.g., the HARQ-ACK feedback carried in PUCCH and/or PUSCH) corresponding to the downlink data transmission is scheduled to be transmitted by the UE in a first uplink control resource (e.g., PUCCH and/or PUSCH) that overlaps, at least to some degree, with a downlink and/or flexible resource. For example, the UE and/or base station may use a dynamic SFI indication (e.g., carried or otherwise conveyed in DCI format 2_0) that changes the symbol(s)/slot(s) of the first uplink control resource from U or F configurations to a D configuration. Accordingly, the base station and/or UE may identify a second uplink control resource (e.g., a subsequent PUCCH) to use for transmitting the uplink feedback message (e.g., the HARQ-ACK feedback). Accordingly, the delayed feedback message may be transmitted using the second uplink control resources, rather than being dropped as is done in other wireless communication systems.

For example, the UE may receive a downlink data transmission (e.g., PDSCH 335) during downlink slot 305. The downlink data transmission may be performed using SPS resources. The downlink data transmission may have an uplink control resource (e.g., PUCCH 350) configured during uplink slot 320. Accordingly, the UE may transmit an uplink feedback message (e.g., HARQ-ACK feedback carrying a set of HARQ-ACK bits) during uplink slot 320 using PUCCH 350.

The UE may receive another downlink data transmission (e.g., PDSCH 340) during downlink slot 310. The downlink data transmission of PDSCH 340 may be performed using SPS resources. The downlink data transmission may have an uplink control resource (e.g., PUCCH 355, which may be considered the first uplink control resource in this example) configured during downlink slot 325. That is, downlink slot 325 may have originally been configured as an uplink slot, but may have been changed by the base station (e.g., using a dynamic SFI indication) to a downlink slot. Accordingly, the base station and/or UE may determine that the uplink control resource (e.g., PUCCH 355) at least partially overlaps with a downlink resource (e.g., is now configured during a downlink slot) and/or flexible resource (e.g., is now configured during a flexible slot/symbol). Accordingly, the UE and/or base station may identify, based on the overlap, a second uplink control resource (e.g., PUCCH 360) to use for transmitting the uplink feedback message.

The UE may receive another downlink data transmission (e.g., PDSCH 345, which may be referred to as a second downlink data transmission in this example) during downlink slot 315. The downlink data transmission of PDSCH 345 may be performed using SPS resources. The downlink data transmission of PDSCH 345 may have an uplink control resource (e.g., PUCCH 360, which may be considered as the second uplink control resource in this example). As PUCCH 360 (e.g., the second uplink control resource) is scheduled during uplink slot 330, the base station and/or UE may select the second uplink control resource to use for transmitting the uplink feedback message (e.g., the originally delayed HARQ-ACK feedback) and/or the second uplink feedback message (e.g., the HARQ-ACK feedback corresponding to PDSCH 345).

Figure 4:
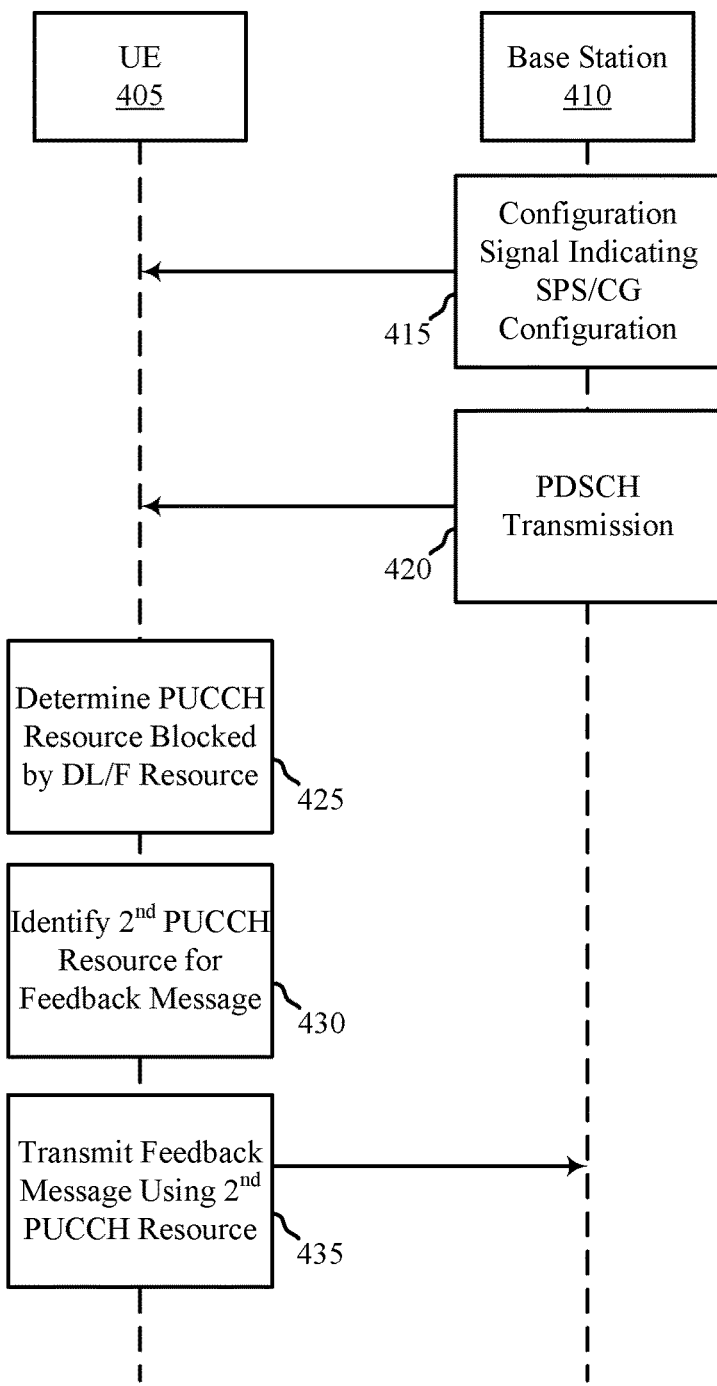
FIG. 4 illustrates an example of a process that supports uplink control resource determination for scheduled communications with delayed feedback reporting in accordance with aspects of the present disclosure.

FIG. 4 illustrates an example of a process 400 that supports uplink control resource determination for scheduled communications with delayed feedback reporting in accordance with aspects of the present disclosure. In some examples, process 400 may implement aspects of wireless communications systems 100 and/or 200 and/or feedback configuration 300. Aspects of process 400 may be implemented at or implemented by UE 405 and/or base station 410, which may be examples of the corresponding devices described herein.

At 415, base station 410 may transmit (and UE 405 may receive) a configuration message indicating an SPS configuration for UE 405. The SPS configuration may correspond to SPS and/or CG resources configured for UE 405. The SPS configuration message may be carried or otherwise conveyed in RRC signaling.

At 420, base station 410 may transmit (and UE 405 may monitor for in order to receive) a downlink data transmission based on the SPS configuration. For example, base station 410 may transmit (and UE 405 may receive) a DCI grant carried in PDCCH that activates one or more of the SPS and/or CG resources configured by the SPS configuration. Accordingly, UE 405 may identify the SPS resources to be used for the downlink data transmission, and monitor those resources. UE 405 may identify feedback information (e.g., HARQ-ACK feedback) for the downlink data transmission. For example, UE 405 may generate a bitmap comprising a set of HARQ-ACK bits, with each bit being set to a value to indicate whether UE 405 was able to successfully receive and decode the corresponding downlink data transmission.

At 425, UE 405 and/or base station 410 may determine that an uplink feedback message corresponding to the downlink data transmission is scheduled to be transmitted by UE 405 in a first uplink control resource that at least partially overlaps with a downlink and/or flexible resource. For example, UE 405 and/or base station 410 may determine that the first uplink control resource (e.g., PUCCH resource) is scheduled during symbol(s)/slot(s) that are now configured as downlink symbol(s)/slot(s). For example, UE 405 may be configured for dynamic SFI monitoring. Accordingly, base station 410 may transmit (and UE 405 may receive) a dynamic SFI indication that reconfigures the symbol(s)/slot(s) corresponding to the first uplink control resource as downlink symbol(s)/slot(s).

Accordingly and at 430, UE 405 and/or base station 10 may identify, based on the overlap, a second uplink control resource to use for transmitting the uplink feedback message. For example, UE 405 and/or base station 410 may identify the next uplink control resource occurring (e.g., in the time domain) after the first uplink control resource to use for transmitting the uplink feedback message. In this situation, the next uplink control resource may be selected or otherwise identified as the second uplink control resource. In some aspects, this may include UE 405 and/or base station

410 identifying the second uplink control resource based on a configuration message (e.g., the original configuration and/or a subsequent configuration message).

At 435, UE 405 may transmit (and base station 410 may receive) the uplink feedback message in the second uplink control resource. In some aspects, the uplink feedback message may correspond to the bitmap comprising the set of HARQ-ACK bits corresponding to the downlink data transmission(s). Accordingly, rather than drop the uplink feedback message in response to the overlap with the downlink and/or flexible resource, the described techniques provide a mechanism where UE 405 and/or base station 410 can identify a backup PUCCH resource to use to convey the uplink feedback message.

Figure 5:
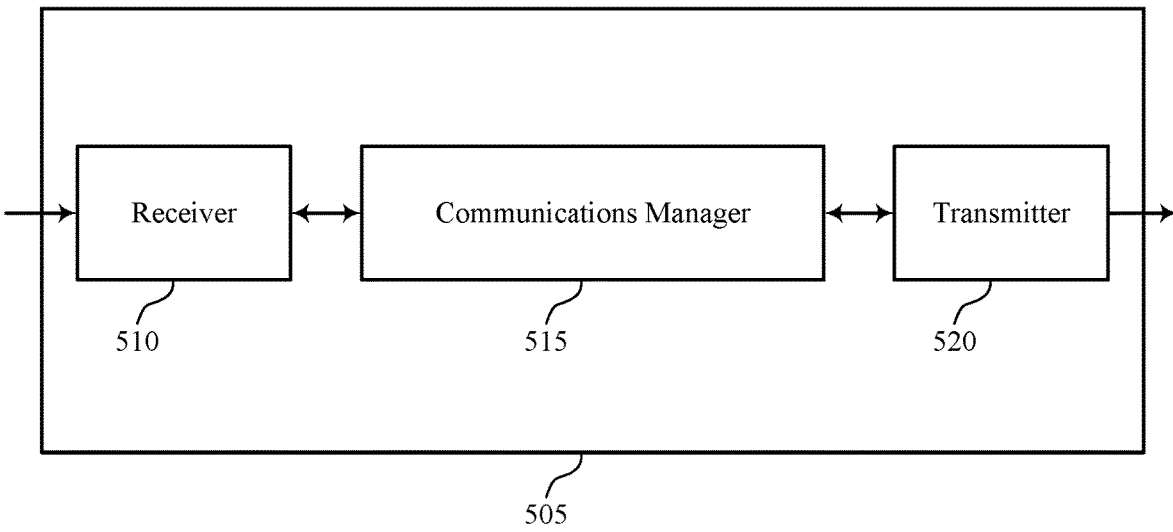
FIGS. 5 and 6 show block diagrams of devices that support uplink control resource determination for scheduled communications with delayed feedback reporting in accordance with aspects of the present disclosure.

FIG. 5 shows a block diagram 500 of a device 505 that supports uplink control resource determination for scheduled communications with delayed feedback reporting in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink control resource determination for scheduled communications with delayed feedback reporting). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration message indicating a semi-persistent scheduling configuration, monitor for a downlink data transmission based on the semi-persistent scheduling configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for transmitting the uplink feedback message. The communications manager 515 may be an example of aspects of the communications manager 810 described herein.

The communications manager 515, or its sub-components, may be implemented in hardware, code (e.g., software) executed by a processor, or any combination thereof. If implemented in code executed by a processor, the functions of the communications manager 515, or its subcomponents may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
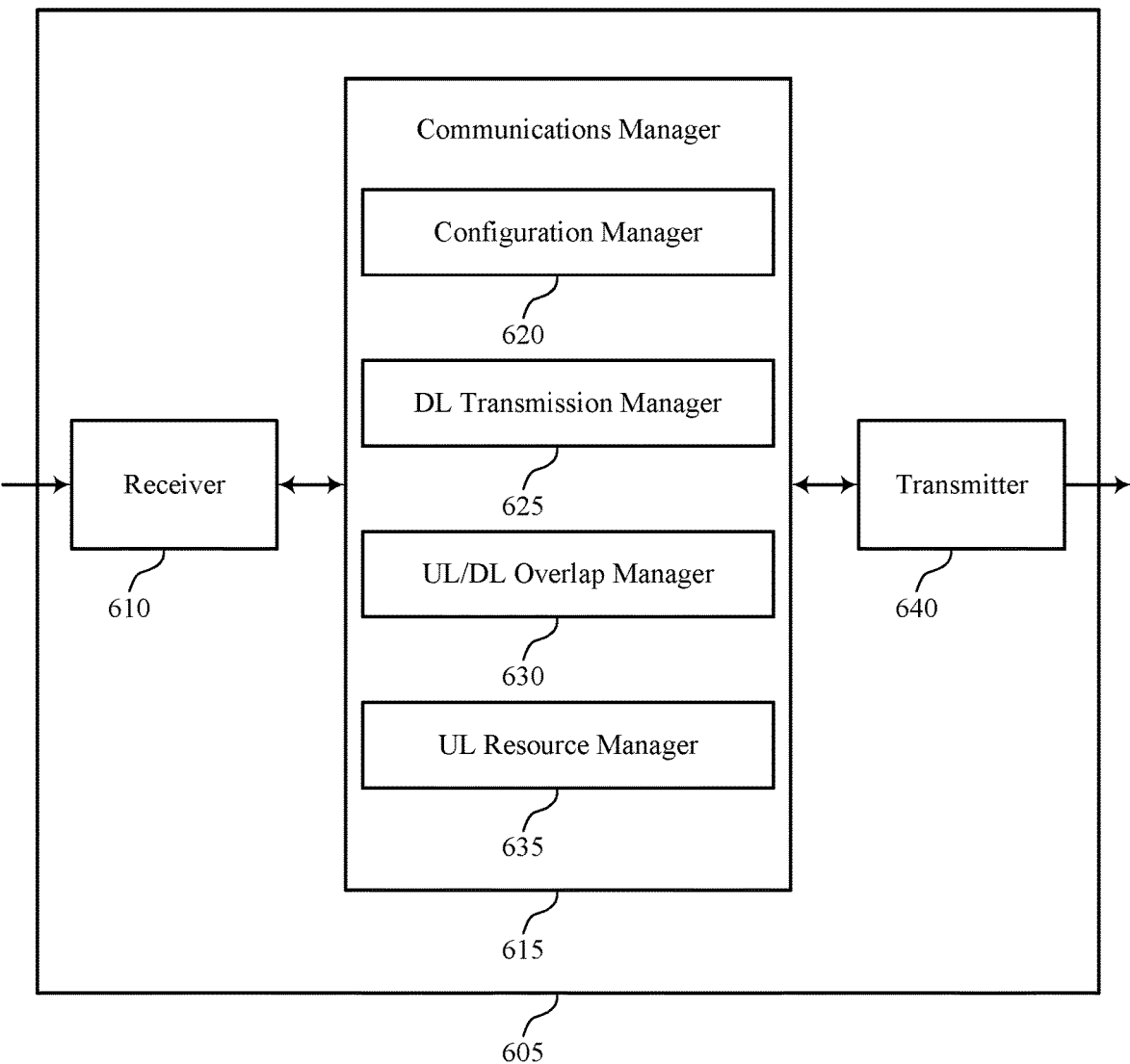

FIG. 6 shows a block diagram 600 of a device 605 that supports uplink control resource determination for scheduled communications with delayed feedback reporting in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to uplink control resource determination for scheduled communications with delayed feedback reporting). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a DL transmission manager 625, an UL/DL overlap manager 630, and an UL resource manager 635. The communications manager 615 may be an example of aspects of the communications manager 810 described herein.

The configuration manager 620 may receive a configuration message indicating a semi-persistent scheduling configuration.

The DL transmission manager 625 may monitor for a downlink data transmission based on the semi-persistent scheduling configuration.

The UL/DL overlap manager 630 may determine that an uplink feedback message corresponding to the downlink data transmission is scheduled to be transmitted by the UE in a first uplink control resource that at least partially overlaps with a downlink resource, a flexible resource, or both.

The UL resource manager 635 may identify, based on the overlap, a second uplink control resource to use for transmitting the uplink feedback message.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
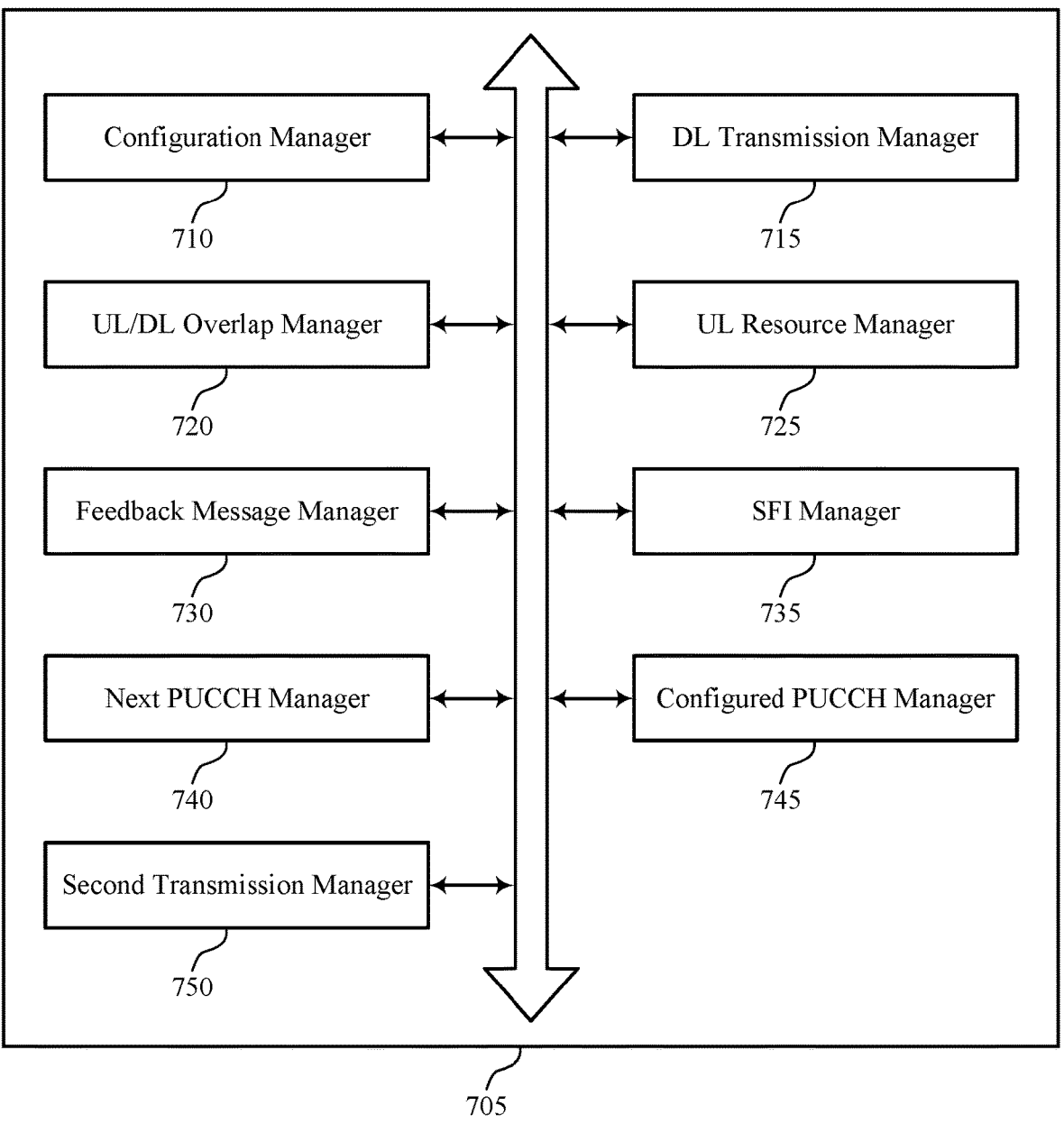
FIG. 7 shows a block diagram of a communications manager that supports uplink control resource determination for scheduled communications with delayed feedback reporting in accordance with aspects of the present disclosure.

FIG. 7 shows a block diagram 700 of a communications manager 705 that supports uplink control resource determination for scheduled communications with delayed feedback reporting in accordance with aspects of the present disclosure. The communications manager 705 may be an example of aspects of a communications manager 515, a communications manager 615, or a communications manager 810 described herein. The communications manager 705 may include a configuration manager 710, a DL transmission manager 715, an UL/DL overlap manager 720, an UL resource manager 725, a feedback message manager 730, a SFI manager 735, a next PUCCH manager 740, a configured PUCCH manager 745, and a second transmission manager 750. Each of these modules may communicate, directly or indirectly, with one another (e.g., via one or more buses).

The configuration manager 710 may receive a configuration message indicating a semi-persistent scheduling configuration.

The DL transmission manager 715 may monitor for a downlink data transmission based on the semi-persistent scheduling configuration.

The UL/DL overlap manager 720 may determine that an uplink feedback message corresponding to the downlink data transmission is scheduled to be transmitted by the UE in a first uplink control resource that at least partially overlaps with a downlink resource, a flexible resource, or both.

The UL resource manager 725 may identify, based on the overlap, a second uplink control resource to use for transmitting the uplink feedback message.

The feedback message manager 730 may transmit the uplink feedback message in the second uplink control resource.

The SFI manager 735 may monitor for a dynamic slot format indicator, where determining that the first uplink control resource at least partially overlaps with the downlink resource, the flexible resource, or both, is based on the UE monitoring for the dynamic slot format indicator.

The next PUCCH manager 740 may identify a next uplink control resource occurring after the first uplink control resource in the time domain for transmitting the uplink feedback message, where the second uplink control resource includes the next uplink control resource.

The configured PUCCH manager 745 may identify the second uplink control resource based on the configuration message.

The second transmission manager 750 may receive a second configuration message indicating a second semi-persistent scheduling configuration. In some examples, the second transmission manager 750 may monitor for a second downlink data transmission based on the second semi-persistent scheduling configuration. In some examples, the second transmission manager 750 may determine that a second uplink feedback message corresponding to the second downlink data transmission is scheduled to be transmitted by the UE in the second uplink control resource that at least partially overlaps with a second downlink resource, a second flexible resource, or both. In some examples, the second transmission manager 750 may identify, based on the overlap, a third uplink control resource to use for transmitting the uplink feedback message, the second uplink feedback message, or both.

In some examples, the second transmission manager 750 may transmit the uplink feedback message corresponding to the downlink data transmission in the third uplink control resource while refraining from transmitting the second uplink feedback message. In some examples, the second transmission manager 750 may transmit the second uplink feedback message corresponding to the second downlink data transmission in the third uplink control resource while refraining from transmitting the uplink feedback message. In some examples, the second transmission manager 750 may refrain from transmitting the uplink feedback message corresponding to the downlink data transmission and the second uplink feedback message corresponding to the second downlink data transmission.

In some examples, the second transmission manager 750 may initiate a first feedback message delay counter corresponding to a transmission delay for the uplink feedback message and a second feedback message delay counter corresponding to the transmission delay for the second uplink feedback message. In some examples, the second transmission manager 750 may transmit or dropping the uplink feedback message based on the first feedback message delay counter. In some examples, the second transmission manager 750 may transmit or dropping the second uplink feedback message based on the second feedback message delay counter.

Figure 8:
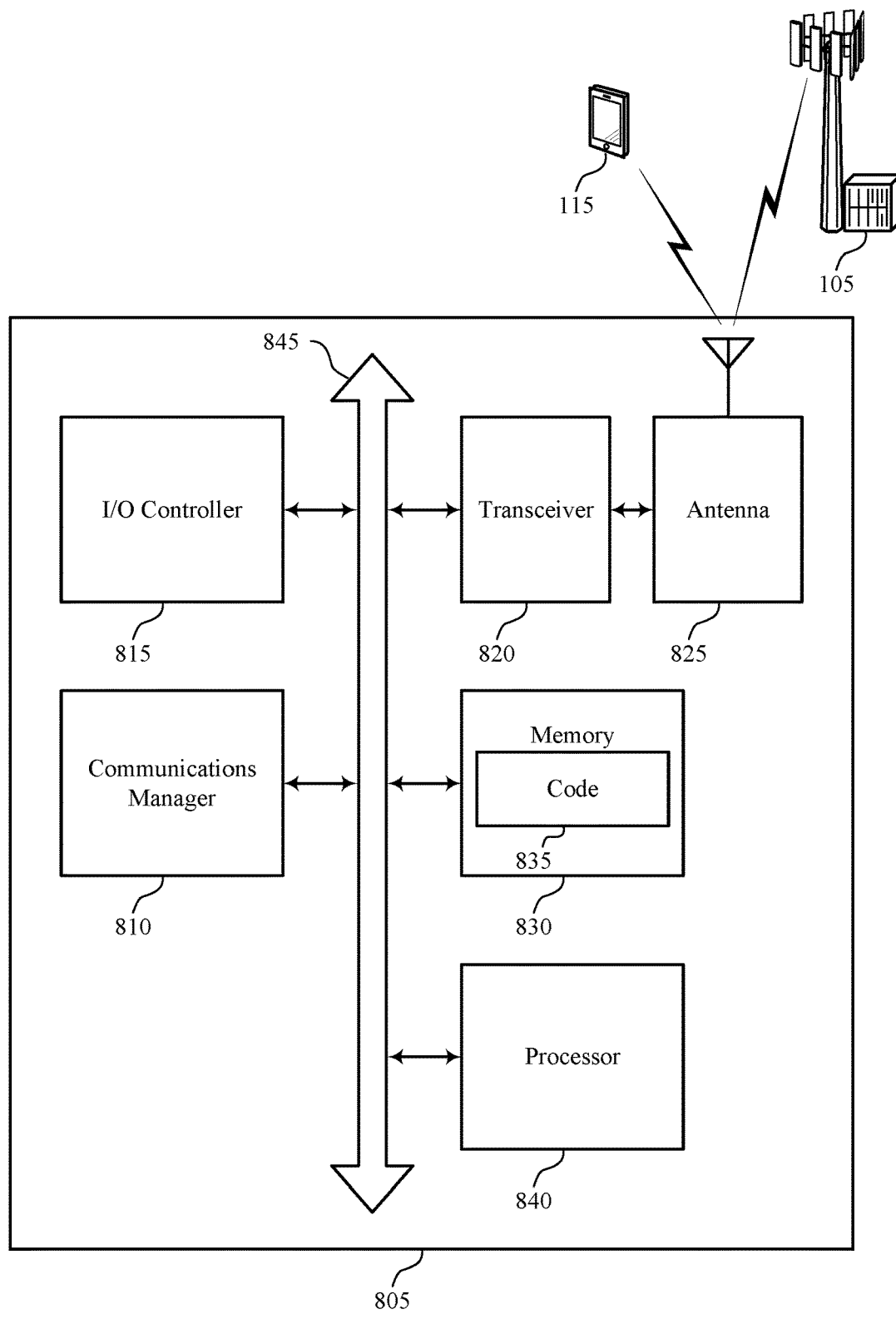
FIG. 8 shows a diagram of a system including a device that supports uplink control resource determination for scheduled communications with delayed feedback reporting in accordance with aspects of the present disclosure.

FIG. 8 shows a diagram of a system 800 including a device 805 that supports uplink control resource determination for scheduled communications with delayed feedback reporting in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration message indicating a semi-persistent scheduling configuration, monitor for a downlink data transmission based on the semi-persistent scheduling configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for transmitting the uplink feedback message.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU (central processing unit), a GPU (graphics processing unit), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink control resource determination for scheduled communications with delayed feedback reporting).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
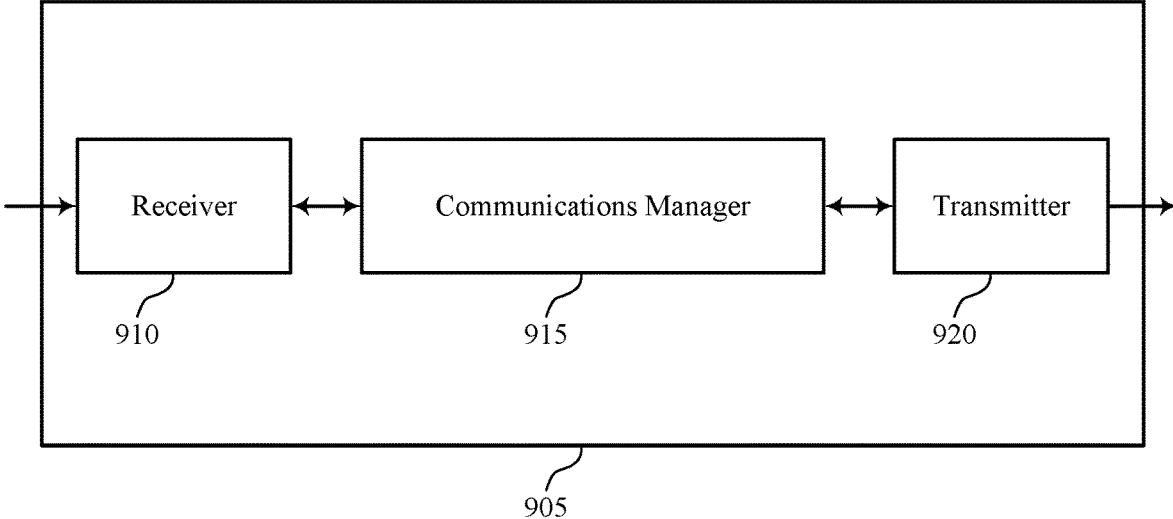
FIGS. 9 and 10 show block diagrams of devices that support uplink control resource determination for scheduled communications with delayed feedback reporting in accordance with aspects of the present disclosure.

FIG. 9 shows a block diagram 900 of a device 905 that supports uplink control resource determination for scheduled communications with delayed feedback reporting in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink control resource determination for scheduled communications with delayed feedback reporting). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a configuration message to a UE indicating a semi-persistent scheduling configuration for the UE, transmit a downlink data transmission to the UE based on the semi-persistent scheduling configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for receiving the uplink feedback message. The communications manager 915 may be an example of aspects of the communications manager 1210 described herein.

The communications manager 915, or its sub-components, may be implemented in hardware, code (e.g., software) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
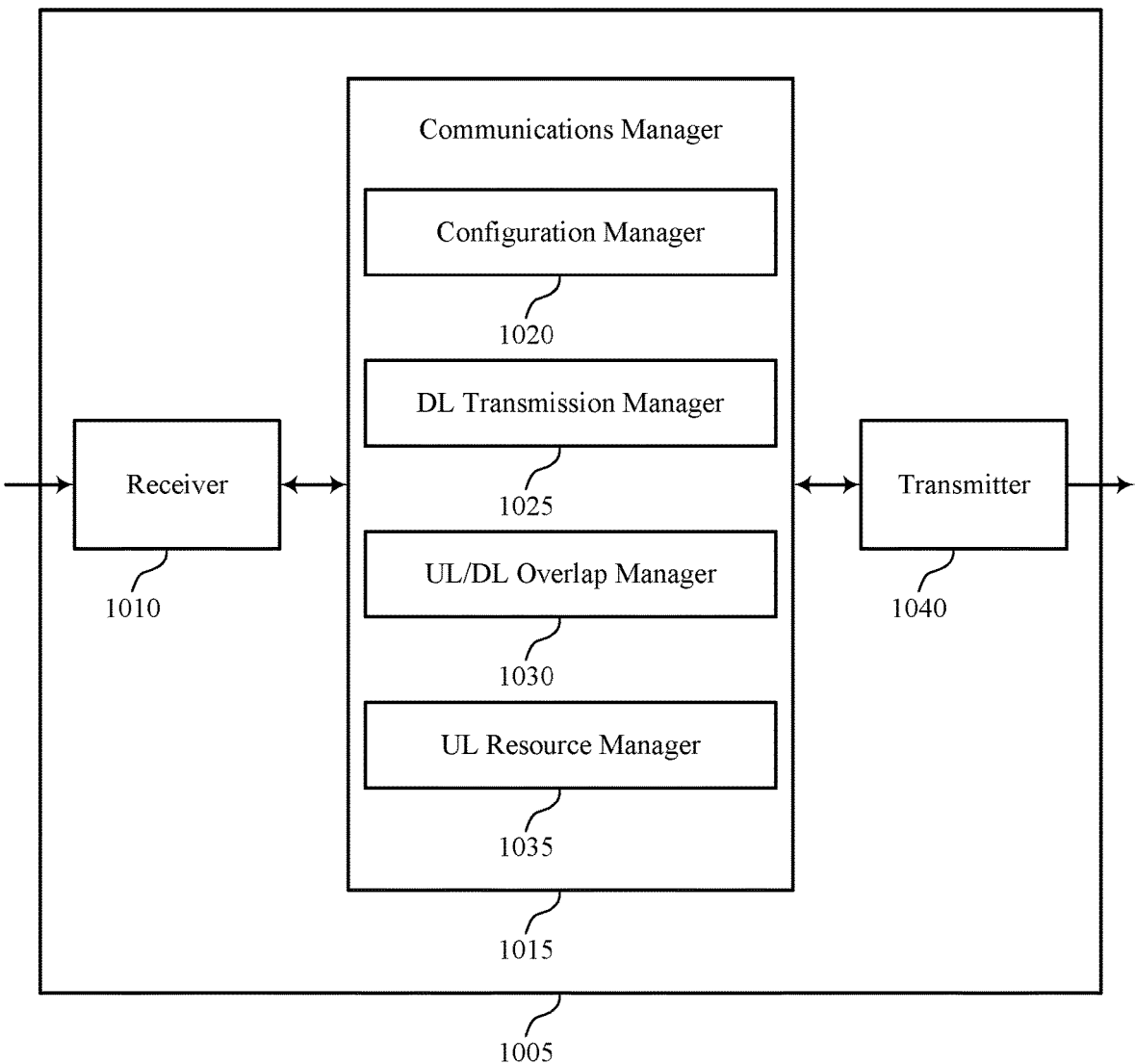

FIG. 10 shows a block diagram 1000 of a device 1005 that supports uplink control resource determination for scheduled communications with delayed feedback reporting in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink control resource determination for scheduled communications with delayed feedback reporting). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration manager 1020, a DL transmission manager 1025, an UL/DL overlap manager 1030, and an UL resource manager 1035. The communications manager 1015 may be an example of aspects of the communications manager 1210 described herein.

The configuration manager 1020 may transmit a configuration message to a UE indicating a semi-persistent scheduling configuration for the UE.

The DL transmission manager 1025 may transmit a downlink data transmission to the UE based on the semi-persistent scheduling configuration.

The UL/DL overlap manager 1030 may determine that an uplink feedback message corresponding to the downlink data transmission is scheduled to be transmitted by the UE in a first uplink control resource that at least partially overlaps with a downlink resource, a flexible resource, or both.

The UL resource manager 1035 may identify, based on the overlap, a second uplink control resource to use for receiving the uplink feedback message.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
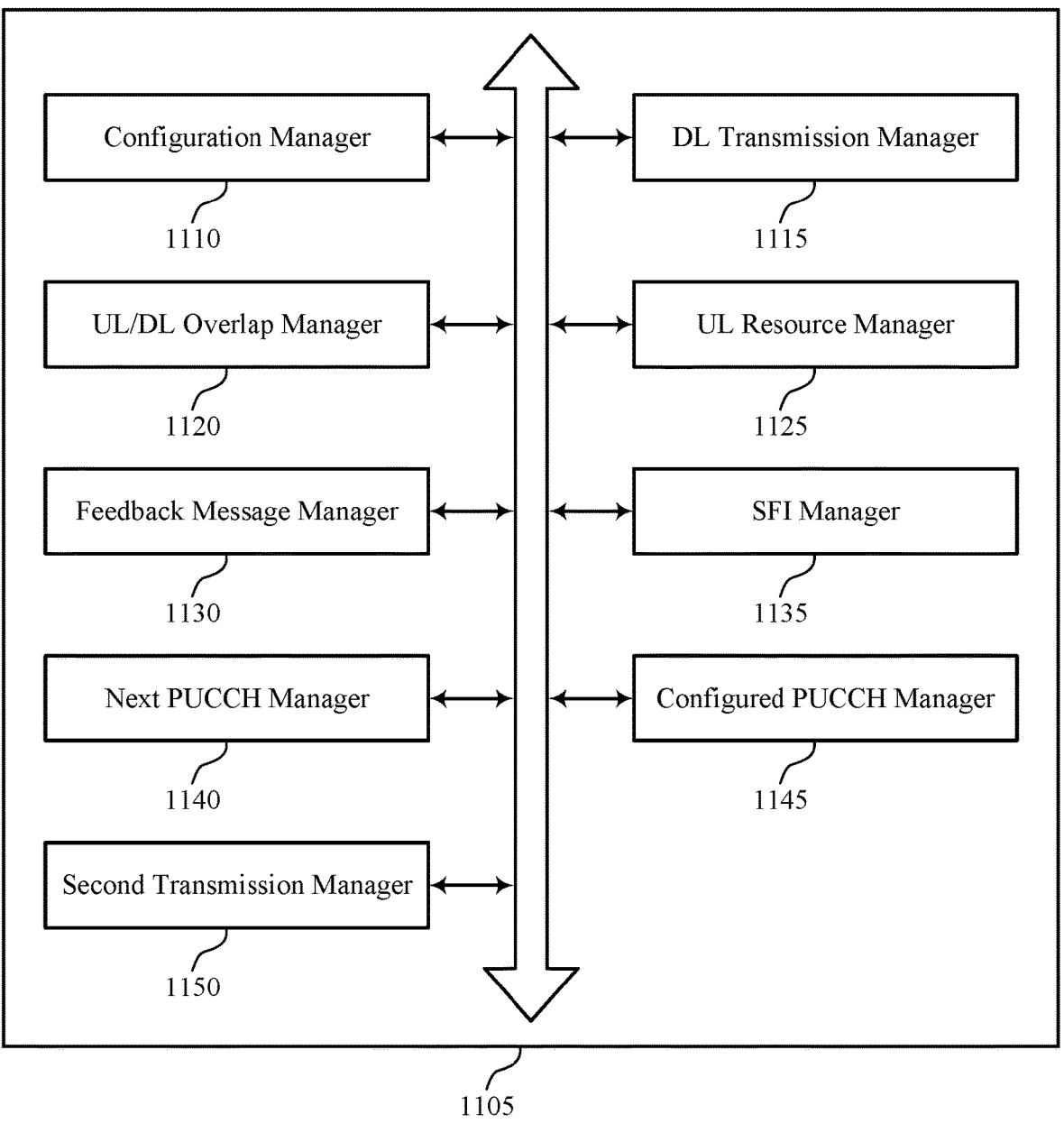
FIG. 11 shows a block diagram of a communications manager that supports uplink control resource determination for scheduled communications with delayed feedback reporting in accordance with aspects of the present disclosure.

FIG. 11 shows a block diagram 1100 of a communications manager 1105 that supports uplink control resource determination for scheduled communications with delayed feedback reporting in accordance with aspects of the present disclosure. The communications manager 1105 may be an example of aspects of a communications manager 915, a communications manager 1015, or a communications manager 1210 described herein. The communications manager 1105 may include a configuration manager 1110, a DL transmission manager 1115, an UL/DL overlap manager 1120, an UL resource manager 1125, a feedback message manager 1130, a SFI manager 1135, a next PUCCH manager 1140, a configured PUCCH manager 1145, and a second transmission manager 1150. Each of these modules may communicate, directly or indirectly, with one another (e.g., via one or more buses).

The configuration manager 1110 may transmit a configuration message to a UE indicating a semi-persistent scheduling configuration for the UE.

The DL transmission manager 1115 may transmit a downlink data transmission to the UE based on the semi-persistent scheduling configuration.

The UL/DL overlap manager 1120 may determine that an uplink feedback message corresponding to the downlink data transmission is scheduled to be transmitted by the UE in a first uplink control resource that at least partially overlaps with a downlink resource, a flexible resource, or both.

The UL resource manager 1125 may identify, based on the overlap, a second uplink control resource to use for receiving the uplink feedback message.

The feedback message manager 1130 may receive the uplink feedback message in the second uplink control resource.

The SFI manager 1135 may transmit a dynamic slot format indicator, where determining that the first uplink control resource at least partially overlaps with the downlink resource, the flexible resource, or both, is based on the UE monitoring for the dynamic slot format indicator.

The next PUCCH manager 1140 may identify a next uplink control resource occurring after the first uplink control resource in the time domain for receiving the uplink feedback message, where the second uplink control resource includes the next uplink control resource.

The configured PUCCH manager 1145 may identify the second uplink control resource based on the configuration message.

The second transmission manager 1150 may transmit a second configuration message indicating a second semi-persistent scheduling configuration for the UE. In some examples, the second transmission manager 1150 may transmit a second downlink data transmission to the UE based on the second semi-persistent scheduling configuration. In some examples, the second transmission manager 1150 may determine that a second uplink feedback message corresponding to the second downlink data transmission is scheduled to be transmitted by the UE in the second uplink control resource that at least partially overlaps with a second downlink resource, a second flexible resource, or both.

In some examples, the second transmission manager 1150 may identify, based on the overlap, a third uplink control resource to use for receiving the uplink feedback message, the second uplink feedback message, or both. In some examples, the second transmission manager 1150 may receive, based on the overlap, the uplink feedback message corresponding to the downlink data transmission in the third uplink control resource while refraining from receiving the second uplink feedback message. In some examples, the second transmission manager 1150 may receive, based on the overlap, the second uplink feedback message corresponding to the second downlink data transmission in the third uplink control resource while refraining from receiving the uplink feedback message.

In some examples, the second transmission manager 1150 may refrain, based on the overlap, from receiving the uplink feedback message corresponding to the downlink data transmission and the second uplink feedback message corresponding to the second downlink data transmission.

Figure 12:
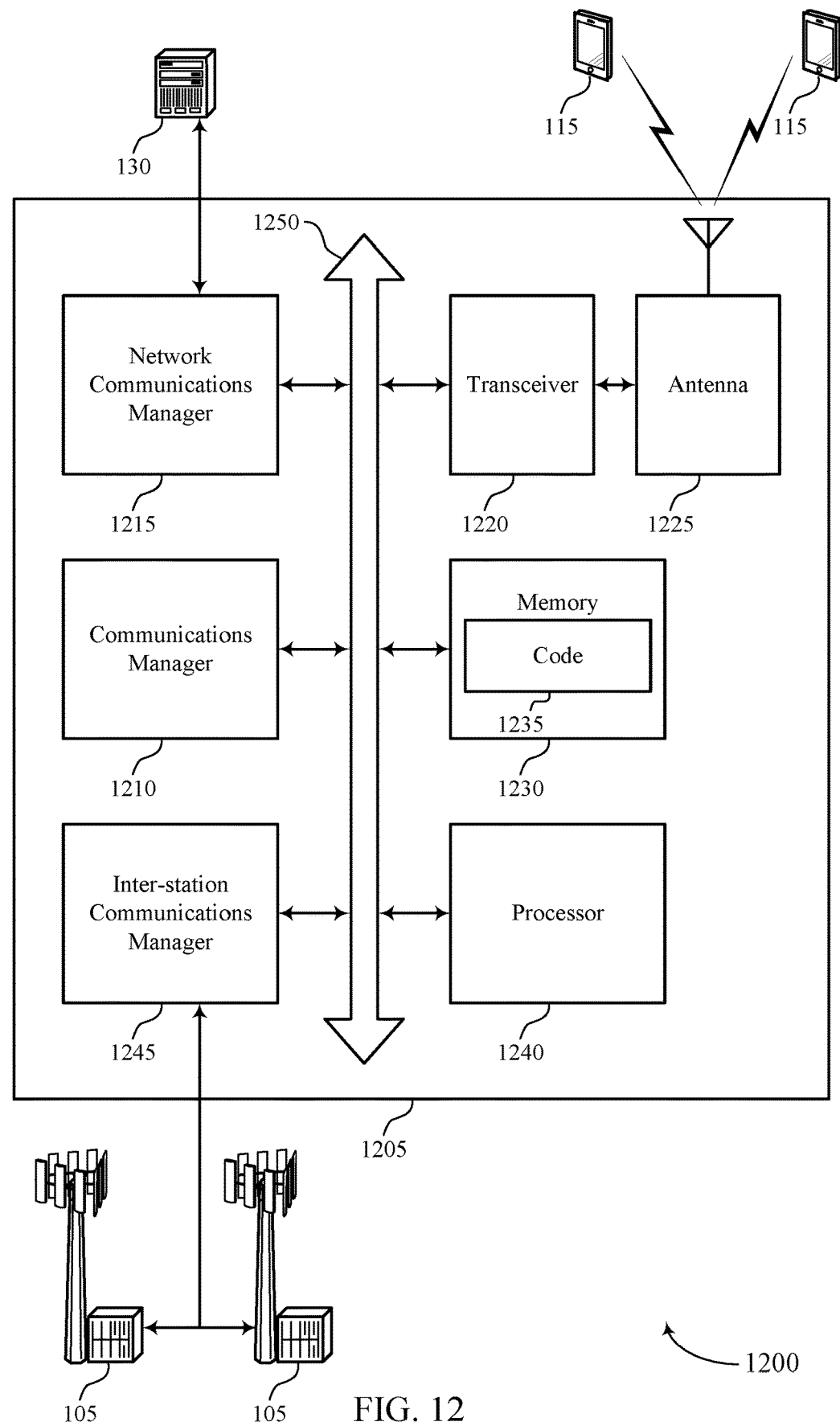
FIG. 12 shows a diagram of a system including a device that supports uplink control resource determination for scheduled communications with delayed feedback reporting in accordance with aspects of the present disclosure.

FIG. 12 shows a diagram of a system 1200 including a device 1205 that supports uplink control resource determination for scheduled communications with delayed feedback reporting in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a configuration message to a UE indicating a semi-persistent scheduling configuration for the UE, transmit a downlink data transmission to the UE based on the semi-persistent scheduling configuration, determine that an uplink feedback message corresponding to the downlink data transmission is scheduled to be transmitted by the UE in a first uplink control resource that at least partially overlaps with a downlink resource, a flexible resource, or both, and identify, based on the overlap, a second uplink control resource to use for receiving the uplink feedback message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink control resource determination for scheduled communications with delayed feedback reporting).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports uplink control resource determination for scheduled communications with delayed feedback reporting in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration message indicating a semi-persistent scheduling configuration. The operations of 1305 may be performed according to the methods described herein. In some examples, aspects of the operations of 1305 may be performed by a configuration manager as described with reference to FIGS. 5 through 8.

At 1310, the UE may monitor for a downlink data transmission based on the semi-persistent scheduling configuration. The operations of 1310 may be performed according to the methods described herein. In some examples, aspects of the operations of 1310 may be performed by a DL transmission manager as described with reference to FIGS. 5 through 8.

At 1315, the UE may determine that an uplink feedback message corresponding to the downlink data transmission is scheduled to be transmitted by the UE in a first uplink control resource that at least partially overlaps with a downlink resource, a flexible resource, or both. The operations of 1315 may be performed according to the methods described herein. In some examples, aspects of the operations of 1315 may be performed by an UL/DL overlap manager as described with reference to FIGS. 5 through 8.

At 1320, the UE may identify, based on the overlap, a second uplink control resource to use for transmitting the uplink feedback message. The operations of 1320 may be performed according to the methods described herein. In some examples, aspects of the operations of 1320 may be performed by an UL resource manager as described with reference to FIGS. 5 through 8.

FIG. 14 shows a flowchart illustrating a method 1400 that supports uplink control resource determination for scheduled communications with delayed feedback reporting in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration message indicating a semi-persistent scheduling configuration. The operations of 1405 may be performed according to the methods described herein. In some examples, aspects of the operations of 1405 may be performed by a configuration manager as described with reference to FIGS. 5 through 8.

At 1410, the UE may monitor for a downlink data transmission based on the semi-persistent scheduling configuration. The operations of 1410 may be performed according to the methods described herein. In some examples, aspects of the operations of 1410 may be performed by a DL transmission manager as described with reference to FIGS. 5 through 8.

At 1415, the UE may determine that an uplink feedback message corresponding to the downlink data transmission is scheduled to be transmitted by the UE in a first uplink control resource that at least partially overlaps with a downlink resource, a flexible resource, or both. The operations of 1415 may be performed according to the methods described herein. In some examples, aspects of the operations of 1415 may be performed by an UL/DL overlap manager as described with reference to FIGS. 5 through 8.

At 1420, the UE may identify, based on the overlap, a second uplink control resource to use for transmitting the uplink feedback message. The operations of 1420 may be performed according to the methods described herein. In some examples, aspects of the operations of 1420 may be performed by an UL resource manager as described with reference to FIGS. 5 through 8.

At 1425, the UE may transmit the uplink feedback message in the second uplink control resource. The operations of 1425 may be performed according to the methods described herein. In some examples, aspects of the operations of 1425 may be performed by a feedback message manager as described with reference to FIGS. 5 through 8.

FIG. 15 shows a flowchart illustrating a method 1500 that supports uplink control resource determination for scheduled communications with delayed feedback reporting in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration message indicating a semi-persistent scheduling configuration. The operations of 1505 may be performed according to the methods described herein. In some examples, aspects of the operations of 1505 may be performed by a configuration manager as described with reference to FIGS. 5 through 8.

At 1510, the UE may monitor for a downlink data transmission based on the semi-persistent scheduling configuration. The operations of 1510 may be performed according to the methods described herein. In some examples, aspects of the operations of 1510 may be performed by a DL transmission manager as described with reference to FIGS. 5 through 8.

At 1515, the UE may monitor for a dynamic slot format indicator, where determining that the first uplink control resource at least partially overlaps with the downlink resource, the flexible resource, or both, is based on the UE monitoring for the dynamic slot format indicator. The operations of 1515 may be performed according to the methods described herein. In some examples, aspects of the operations of 1515 may be performed by a SFI manager as described with reference to FIGS. 5 through 8.

At 1520, the UE may determine that an uplink feedback message corresponding to the downlink data transmission is scheduled to be transmitted by the UE in a first uplink control resource that at least partially overlaps with a downlink resource, a flexible resource, or both. The operations of 1520 may be performed according to the methods described herein. In some examples, aspects of the operations of 1520 may be performed by an UL/DL overlap manager as described with reference to FIGS. 5 through 8.

At 1525, the UE may identify, based on the overlap, a second uplink control resource to use for transmitting the uplink feedback message. The operations of 1525 may be performed according to the methods described herein. In some examples, aspects of the operations of 1525 may be performed by an UL resource manager as described with reference to FIGS. 5 through 8.

FIG. 16 shows a flowchart illustrating a method 1600 that supports uplink control resource determination for scheduled communications with delayed feedback reporting in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a configuration message to a UE indicating a semi-persistent scheduling configuration for the UE. The operations of 1605 may be performed according to the methods described herein. In some examples, aspects of the operations of 1605 may be performed by a configuration manager as described with reference to FIGS. 9 through 12.

At 1610, the base station may transmit a downlink data transmission to the UE based on the semi-persistent scheduling configuration. The operations of 1610 may be performed according to the methods described herein. In some examples, aspects of the operations of 1610 may be performed by a DL transmission manager as described with reference to FIGS. 9 through 12.

At 1615, the base station may determine that an uplink feedback message corresponding to the downlink data transmission is scheduled to be transmitted by the UE in a first uplink control resource that at least partially overlaps with a downlink resource, a flexible resource, or both. The operations of 1615 may be performed according to the methods described herein. In some examples, aspects of the operations of 1615 may be performed by an UL/DL overlap manager as described with reference to FIGS. 9 through 12.

At 1620, the base station may identify, based on the overlap, a second uplink control resource to use for receiving the uplink feedback message. The operations of 1620 may be performed according to the methods described herein. In some examples, aspects of the operations of 1620 may be performed by an UL resource manager as described with reference to FIGS. 9 through 12.

FIG. 17 shows a flowchart illustrating a method 1700 that supports uplink control resource determination for scheduled communications with delayed feedback reporting in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit a configuration message to a UE indicating a semi-persistent scheduling configuration for the UE. The operations of 1705 may be performed according to the methods described herein. In some examples, aspects of the operations of 1705 may be performed by a configuration manager as described with reference to FIGS. 9 through 12.

At 1710, the base station may transmit a downlink data transmission to the UE based on the semi-persistent scheduling configuration. The operations of 1710 may be performed according to the methods described herein. In some examples, aspects of the operations of 1710 may be performed by a DL transmission manager as described with reference to FIGS. 9 through 12.

At 1715, the base station may determine that an uplink feedback message corresponding to the downlink data transmission is scheduled to be transmitted by the UE in a first uplink control resource that at least partially overlaps with a downlink resource, a flexible resource, or both. The operations of 1715 may be performed according to the methods described herein. In some examples, aspects of the operations of 1715 may be performed by an UL/DL overlap manager as described with reference to FIGS. 9 through 12.

At 1720, the base station may identify, based on the overlap, a second uplink control resource to use for receiving the uplink feedback message. The operations of 1720 may be performed according to the methods described herein. In some examples, aspects of the operations of 1720 may be performed by an UL resource manager as described with reference to FIGS. 9 through 12.

At 1725, the base station may identify a next uplink control resource occurring after the first uplink control resource in the time domain for receiving the uplink feedback message, where the second uplink control resource includes the next uplink control resource. The operations of 1725 may be performed according to the methods described herein. In some examples, aspects of the operations of 1725 may be performed by a next PUCCH manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a configuration message indicating a SPS configuration; monitoring for a downlink data transmission based at least in part on the SPS configuration; determining that an uplink feedback message corresponding to the downlink data transmission is scheduled to be transmitted by the UE in a first uplink control resource that at least partially overlaps with a downlink resource, a flexible resource, or both; and identifying, based at least in part on the overlap, a second uplink control resource to use for transmitting the uplink feedback message.

Aspect 2: The method of aspect 1, further comprising: transmitting the uplink feedback message in the second uplink control resource.

Aspect 3: The method of any of aspects 1 through 2, further comprising: monitoring for a dynamic slot format indicator, wherein determining that the first uplink control resource at least partially overlaps with the downlink resource, the flexible resource, or both, is based at least in part on the UE monitoring for the dynamic slot format indicator.

Aspect 4: The method of any of aspects 1 through 3, further comprising: identifying a next uplink control resource occurring after the first uplink control resource in the time domain for transmitting the uplink feedback message, wherein the second uplink control resource comprises the next uplink control resource.

Aspect 5: The method of any of aspects 1 through 4, further comprising: identifying the second uplink control resource based at least in part on the configuration message.

Aspect 6: The method of any of aspects 1 through 5, further comprising: receiving a second configuration message indicating a second SPS configuration; monitoring for a second downlink data transmission based at least in part on the second SPS configuration; determining that a second uplink feedback message corresponding to the second downlink data transmission is scheduled to be transmitted by the UE in the second uplink control resource that at least partially overlaps with a second downlink resource, a second flexible resource, or both; and identifying, based at least in part on the overlap, a third uplink control resource to use for transmitting the uplink feedback message, the second uplink feedback message, or both.

Aspect 7: The method of aspect 6, further comprising: transmitting the uplink feedback message corresponding to the downlink data transmission in the third uplink control resource while refraining from transmitting the second uplink feedback message.

Aspect 8: The method of any of aspects 6 through 7, further comprising: transmitting the second uplink feedback message corresponding to the second downlink data transmission in the third uplink control resource while refraining from transmitting the uplink feedback message.

Aspect 9: The method of any of aspects 6 through 8, further comprising: refraining from transmitting the uplink feedback message corresponding to the downlink data transmission and the second uplink feedback message corresponding to the second downlink data transmission.

Aspect 10: The method of any of aspects 6 through 9, further comprising: initiating a first feedback message delay counter corresponding to a transmission delay for the uplink feedback message and a second feedback message delay counter corresponding to the transmission delay for the second uplink feedback message; transmitting or dropping the uplink feedback message based at least in part on the first feedback message delay counter; and transmitting or dropping the second uplink feedback message based at least in part on the second feedback message delay counter.

Aspect 11: A method for wireless communication at a base station, comprising: transmitting a configuration message to a UE indicating a SPS configuration for the UE; transmitting a downlink data transmission to the UE based at least in part on the SPS configuration; determining that an uplink feedback message corresponding to the downlink data transmission is scheduled to be transmitted by the UE in a first uplink control resource that at least partially overlaps with a downlink resource, a flexible resource, or both; and identifying, based at least in part on the overlap, a second uplink control resource to use for receiving the uplink feedback message.

Aspect 12: The method of aspect 11, further comprising: receiving the uplink feedback message in the second uplink control resource.

Aspect 13: The method of any of aspects 11 through 12, further comprising: transmitting a dynamic slot format indicator, wherein determining that the first uplink control resource at least partially overlaps with the downlink resource, the flexible resource, or both, is based at least in part on the UE monitoring for the dynamic slot format indicator.

Aspect 14: The method of any of aspects 11 through 13, further comprising: identifying a next uplink control resource occurring after the first uplink control resource in the time domain for receiving the uplink feedback message, wherein the second uplink control resource comprises the next uplink control resource.

Aspect 15: The method of any of aspects 11 through 14, further comprising: identifying the second uplink control resource based at least in part on the configuration message.

Aspect 16: The method of any of aspects 11 through 15, further comprising: transmitting a second configuration message indicating a second SPS configuration for the UE;

transmitting a second downlink data transmission to the UE based at least in part on the second SPS configuration; determining that a second uplink feedback message corresponding to the second downlink data transmission is scheduled to be transmitted by the UE in the second uplink control resource that at least partially overlaps with a second downlink resource, a second flexible resource, or both; and identifying, based at least in part on the overlap, a third uplink control resource to use for receiving the uplink feedback message, the second uplink feedback message, or both.

Aspect 17: The method of aspect 16, further comprising: receiving, based at least in part on the overlap, the uplink feedback message corresponding to the downlink data transmission in the third uplink control resource while refraining from receiving the second uplink feedback message.

Aspect 18: The method of any of aspects 16 through 17, further comprising: receiving, based at least in part on the overlap, the second uplink feedback message corresponding to the second downlink data transmission in the third uplink control resource while refraining from receiving the uplink feedback message.

Aspect 19: The method of any of aspects 16 through 18, further comprising: refraining, based at least in part on the overlap, from receiving the uplink feedback message corresponding to the downlink data transmission and the second uplink feedback message corresponding to the second downlink data transmission.

Aspect 20: An apparatus for wireless communication at a UE, comprising a processor; memory coupled with the processor; and instructions stored in the memory and executable by the processor to cause the apparatus to perform a method of any of aspects 1 through 10.

Aspect 21: An apparatus for wireless communication at a UE, comprising at least one means for performing a method of any of aspects 1 through 10.

Aspect 22: A non-transitory computer-readable medium storing code for wireless communication at a UE, the code comprising instructions executable by a processor to perform a method of any of aspects 1 through 10.

Aspect 23: An apparatus for wireless communication at a base station, comprising a processor; memory coupled with the processor; and instructions stored in the memory and executable by the processor to cause the apparatus to perform a method of any of aspects 11 through 19.

Aspect 24: An apparatus for wireless communication at a base station, comprising at least one means for performing a method of any of aspects 11 through 19.

Aspect 25: A non-transitory computer-readable medium storing code for wireless communication at a base station, the code comprising instructions executable by a processor to perform a method of any of aspects 11 through 19.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. If implemented in software executed by a processor, the functions may be stored on or transmitted over as one or more instructions or code on a computer-readable medium. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C) or multiple instances of the same item (e.g., AA or BBBC or AAABCCCC, etc.). As used herein, including in the claims, the term "and/or," when used in a list of two or more items, means that any one of the listed items can be employed by itself, or any combination of two or more of the listed items can be employed, including multiple instances of the same item. For example, if a composition is described as containing components A, B, and/or C, the composition can contain A alone; B alone; C alone; A and B in combination; A and C in combination; B and C in combination; or A, B, and C in combination. Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving radio resource control signaling indicating a semi-persistent scheduling configuration and an offset associated with delayed feedback reporting for the semi-persistent scheduling configuration;

monitoring for a downlink data transmission based at least in part on the semi-persistent scheduling configuration;

determining that an uplink feedback message corresponding to the downlink data transmission is scheduled to be transmitted by the UE in a first uplink control resource that at least partially overlaps with a downlink resource, a flexible resource, or both; and identifying, based at least in part on the overlap, a second uplink control resource to use for transmitting the uplink feedback message in accordance with the offset associated with delayed feedback reporting.

2. The method of claim 1, further comprising:

transmitting the uplink feedback message in the second uplink control resource.

3. The method of claim 1, further comprising:

monitoring for a dynamic slot format indicator, wherein determining that the first uplink control resource at least partially overlaps with the downlink resource, the flexible resource, or both, is based at least in part on the UE monitoring for the dynamic slot format indicator.

4. The method of claim 1, wherein identifying the second uplink control resource comprises:

identifying an available uplink symbol of the second uplink control resource based at least in part on the semi-persistent scheduling configuration.

5. The method of claim 1, further comprising:

receiving a second configuration message indicating a second semi-persistent scheduling configuration;

monitoring for a second downlink data transmission based at least in part on the second semi-persistent scheduling configuration;

determining that a second uplink feedback message corresponding to the second downlink data transmission is scheduled to be transmitted by the UE in the second uplink control resource that at least partially overlaps with a second downlink resource, a second flexible resource, or both; and identifying, based at least in part on the overlap, a third uplink control resource to use for transmitting the uplink feedback message, the second uplink feedback message, or both.

6. The method of claim 5, further comprising:

transmitting the uplink feedback message corresponding to the downlink data transmission in the third uplink control resource while refraining from transmitting the second uplink feedback message.

7. The method of claim 5, further comprising:

transmitting the second uplink feedback message corresponding to the second downlink data transmission in the third uplink control resource while refraining from transmitting the uplink feedback message.

8. The method of claim 5, further comprising:

refraining from transmitting the uplink feedback message corresponding to the downlink data transmission and the second uplink feedback message corresponding to the second downlink data transmission.

9. The method of claim 5, further comprising:

initiating a first feedback message delay counter corresponding to a transmission delay for the uplink feedback message and a second feedback message delay counter corresponding to the transmission delay for the second uplink feedback message;

transmitting or dropping the uplink feedback message based at least in part on the first feedback message delay counter; and transmitting or dropping the second uplink feedback message based at least in part on the second feedback message delay counter.

10. A method for wireless communication at a base station, comprising:

transmitting radio resource control signaling to a user equipment (UE) indicating a semi-persistent scheduling configuration for the UE and an offset associated with delayed feedback reporting for the semi-persistent scheduling configuration;

transmitting a downlink data transmission to the UE based at least in part on the semi-persistent scheduling configuration;

determining that an uplink feedback message corresponding to the downlink data transmission is scheduled to be transmitted by the UE in a first uplink control resource that at least partially overlaps with a downlink resource, a flexible resource, or both; and identifying, based at least in part on the overlap, a second uplink control resource to use for receiving the uplink feedback message in accordance with the offset associated with delayed feedback reporting.

11. The method of claim 10, further comprising:

receiving the uplink feedback message in the second uplink control resource.

12. The method of claim 10, further comprising:

transmitting a dynamic slot format indicator, wherein determining that the first uplink control resource at least partially overlaps with the downlink resource, the flexible resource, or both, is based at least in part on the dynamic slot format indicator.

13. The method of claim 10, wherein identifying the second uplink control resource comprises:

identifying an available uplink symbol of the second uplink control resource based at least in part on the semi-persistent scheduling configuration.

14. The method of claim 10, further comprising:

transmitting a second configuration message indicating a second semi-persistent scheduling configuration for the UE;

transmitting a second downlink data transmission to the UE based at least in part on the second semi-persistent scheduling configuration;

determining that a second uplink feedback message corresponding to the second downlink data transmission is scheduled to be transmitted by the UE in the second uplink control resource that at least partially overlaps with a second downlink resource, a second flexible resource, or both; and identifying, based at least in part on the overlap, a third uplink control resource to use for receiving the uplink feedback message, the second uplink feedback message, or both.

15. The method of claim 14, further comprising:

receiving, based at least in part on the overlap, the uplink feedback message corresponding to the downlink data transmission in the third uplink control resource while refraining from receiving the second uplink feedback message.

16. The method of claim 14, further comprising:

receiving, based at least in part on the overlap, the second uplink feedback message corresponding to the second downlink data transmission in the third uplink control resource while refraining from receiving the uplink feedback message.

17. The method of claim 14, further comprising:

refraining, based at least in part on the overlap, from receiving the uplink feedback message corresponding to the downlink data transmission and the second uplink feedback message corresponding to the second downlink data transmission.

18. An apparatus for wireless communication at a user equipment (UE), comprising:

at least one processor, at least one memory coupled with the at least one processor; and instructions stored in the at least one memory and executable by the at least one processor to cause the apparatus to:

receive radio resource control signaling indicating a semi-persistent scheduling configuration and an offset associated with delayed feedback reporting for the semi-persistent scheduling configuration;

monitor for a downlink data transmission based at least in part on the semi-persistent scheduling configuration;

determine that an uplink feedback message corresponding to the downlink data transmission is scheduled to be transmitted by the UE in a first uplink control resource that at least partially overlaps with a downlink resource, a flexible resource, or both; and identify, based at least in part on the overlap, a second uplink control resource to use for transmitting the uplink feedback message in accordance with the offset associated with delayed feedback reporting.

19. The apparatus of claim 18, wherein the instructions are further executable by the at least one processor to cause the apparatus to:

transmit the uplink feedback message in the second uplink control resource.

20. The apparatus of claim 18, wherein the instructions are further executable by the at least one processor to cause the apparatus to:

monitor for a dynamic slot format indicator, wherein determining that the first uplink control resource at least partially overlaps with the downlink resource, the flexible resource, or both, is based at least in part on the UE monitoring for the dynamic slot format indicator.

21. The apparatus of claim 18, wherein the instructions to identify the second uplink control resource are further executable by the at least one processor to cause the apparatus to:

identify an available uplink symbol of the second uplink control resource based at least in part on the semi-persistent scheduling configuration.

22. The apparatus of claim 18, wherein the instructions are further executable by the at least one processor to cause the apparatus to:

receive a second configuration message indicating a second semi-persistent scheduling configuration;

monitor for a second downlink data transmission based at least in part on the second semi-persistent scheduling configuration;

determine that a second uplink feedback message corresponding to the second downlink data transmission is scheduled to be transmitted by the UE in the second uplink control resource that at least partially overlaps with a second downlink resource, a second flexible resource, or both; and identify, based at least in part on the overlap, a third uplink control resource to use for transmitting the uplink feedback message, the second uplink feedback message, or both.

23. An apparatus for wireless communication at a base station, comprising:

at least one processor, at least one memory coupled with the at least one processor; and instructions stored in the at least one memory and executable by the at least one processor to cause the apparatus to:

transmit radio resource control signaling to a user equipment (UE) indicating a semi-persistent scheduling configuration for the UE and an offset associated with delayed feedback reporting for the semi-persistent scheduling configuration;

transmit a downlink data transmission to the UE based at least in part on the semi-persistent scheduling configuration;

determine that an uplink feedback message corresponding to the downlink data transmission is scheduled to be transmitted by the UE in a first uplink control resource that at least partially overlaps with a downlink resource, a flexible resource, or both; and identify, based at least in part on the overlap, a second uplink control resource to use for receiving the uplink feedback message in accordance with the offset associated with delayed feedback reporting.

24. The apparatus of claim 23, wherein the instructions are further executable by the at least one processor to cause the apparatus to:

receive the uplink feedback message in the second uplink control resource.

25. The apparatus of claim 23, wherein the instructions are further executable by the at least one processor to cause the apparatus to:

transmit a dynamic slot format indicator, wherein determining that the first uplink control resource at least partially overlaps with the downlink resource, the flexible resource, or both, is based at least in part on the dynamic slot format indicator.

26. The apparatus of claim 23, wherein the instructions to identify the second uplink control resource are further executable by the at least one processor to cause the apparatus to:

identify an available uplink symbol of the second uplink control resource based at least in part on the semi-persistent scheduling configuration.

* * * * *